(12) United States Patent  (10) Patent No.: US 12,294,882 B2
Su et al.  (45) Date of Patent: May 6, 2025

(54) MEASUREMENT METHOD, DEVICE, AND SYSTEM

(71) Applicant: Huawei Technologies Co., Ltd., Shenzhen (CN)

(72) Inventors: Yuwan Su, Shenzhen (CN); Meng Zhang, Shenzhen (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 17/671,329

(22) Filed: Feb. 14, 2022

(65) Prior Publication Data

US 2022/0167202 A1 May 26, 2022

Related U.S. Application Data

(63) Continuation of application No. PCT/CN2019/100888, filed on Aug. 15, 2019.

(51) Int. Cl.
*H04W 24/10* (2009.01)
*H04L 5/00* (2006.01)
(Continued)

(52) U.S. Cl.
CPC ......... *H04W 24/10* (2013.01); *H04L 5/0051* (2013.01); *H04W 68/005* (2013.01); *H04W 76/28* (2018.02)

(58) Field of Classification Search
CPC ... H04W 24/10; H04W 68/005; H04W 76/28; H04W 24/08; H04W 48/16; H04L 5/0051; H04L 5/001; H04L 5/0048
See application file for complete search history.

(56) References Cited

U.S. PATENT DOCUMENTS

| | | | |
|---|---|---|---|
| 2020/0029256 A1* | 1/2020 | Rico Alvarino | H04W 72/0453 |
| 2020/0275289 A1* | 8/2020 | Thangarasa | H04B 17/24 |
| 2021/0314117 A1* | 10/2021 | Wang | H04L 5/006 |

FOREIGN PATENT DOCUMENTS

| | | |
|---|---|---|
| CN | 105898777 A | 8/2016 |
| CN | 106507418 A | 3/2017 |

(Continued)

OTHER PUBLICATIONS

Of 3GPP TSG-RAN WG2 #101 bis, R2-1804724, Source: Ericsson Title: UE in RRC_Inactive state camping on an acceptable cell, Sanya, China, Apr. 16-20, 2018 (Year: 2018).*

(Continued)

*Primary Examiner* — Edan Orgad
*Assistant Examiner* — Malick A Sohrab
(74) *Attorney, Agent, or Firm* — Leydig, Voit & Mayer, Ltd.

(57) ABSTRACT

A measurement method, a device, and a system are provided, so that a communications device can determine criterion S on a serving cell when performing radio resource management (RRM) measurement on a non-anchor carrier. The method includes: a communications device determines a first reference signal received power based on at least one measurement result obtained by measuring a reference signal received power on a first non-anchor carrier, where the first non-anchor carrier is a carrier on which the communications device receives a paging message from a network device in a serving cell in which the communications device is located; and the communications device determines criterion S on the serving cell based on the first reference signal received power.

20 Claims, 12 Drawing Sheets

(51) Int. Cl.
    *H04W 68/00*     (2009.01)
    *H04W 76/28*     (2018.01)

(56) References Cited

FOREIGN PATENT DOCUMENTS

| | | | | |
|---|---|---|---|---|
| CN | 107846710 | A | 3/2018 | |
| CN | 107864482 | A | 3/2018 | |
| CN | 108307378 | A | 7/2018 | |
| EP | 3592092 | B1 * | 10/2021 | ............ H04W 16/32 |
| WO | 2018027933 | A1 | 2/2018 | |
| WO | 2018170860 | A1 | 9/2018 | |

OTHER PUBLICATIONS

3GPP TS 36.304 V15.4.0 (Jun. 2019)—3rd Generation Partnership Project; Technical Specification Group Radio Access Network; Evolved Universal Terrestrial Radio Access (E-UTRA); User Equipment (UE) procedures in idle mode (Year: 2019).*

3GPP TSG-RAN WG2 #101 bis, R2-1804724, Source: Ericsson Title: UE in RRC_Inactive state camping on an acceptable cell, Sanya, China, Apr. 16-20, 2018 (Year: 2018).*

"Discussion on NRS presence on non-anchor carriers," 3GPP TSG-RAN WG4 Meeting #91, Reno, USA, R4-1905608, Total 4 pages, 3rd Generation Partnership Project, Valbonne, France (May 13-17, 2019).

"On NB-IoT RRM measurements in non-anchor carrier," 3GPP TSG-RAN WG4 Meeting #91, Reno, USA, R4-1906964, Total 4 pages, 3rd Generation Partnership Project, Valbonne, France (May 13-17, 2019).

"UE in RRC_Inactive state camping on an acceptable cell," 3GPP TSG-RAN WG2 #101bis, Sanya, China, Tdoc R2-1804724, Total 3 pages, 3rd Generation Partnership Project, Valbonne, France (Apr. 16-20, 2018).

"Discussion on RRM measurements on non-anchor carrier," 3GPP TSG-RAN WG2 Meeting #107bis, Chongqing, China, R2-1912602 Revision of R2-1910167, XP051804556, Total 6 pages, 3rd Generation Partnership Project, Valbonne, France (Oct. 14-19, 2019).

Qualcomm Incorporated, "Non-anchor PRB enhancements," 3GPP TSG RAN WG1 Meeting #88, Athens, Greece, R1-1702551, total 4 pages, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA); Requirements for support of radio resource management (Release 16)," 3GPP TS 36.133 V16.2.0, total 715 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); User Equipment (UE) procedures in idle mode (Release 15)," 3GPP TS 36.304 V15.4.0, total 55 pages, 3rd Generation Partnership Project, Valbonne, France (Jun. 2019).

"3rd Generation Partnership Project; Technical Specification Group Radio Access Network; Evolved Universal Terrestrial Radio Access (E-UTRA); Physical channels and modulation (Release 15)," 3GPP TS 36.211 V15.6.0, total 239 pages, 3rd Generation Partnership Project, Valbonne, France (Jun. 2019).

* cited by examiner

MEASUREMENT METHOD, DEVICE, AND SYSTEM

CROSS-REFERENCE TO RELATED APPLICATIONS

This application is a continuation of International Application No. PCT/CN2019/100888, filed on Aug. 15, 2019, the disclosure of which is hereby incorporated by reference in its entirety.

TECHNICAL FIELD

This application relates to the field of communications technologies, and in particular, to a measurement method, a device, and a system.

BACKGROUND

In a current narrowband internet of things (NB-IoT) system, there are two carrier types: an anchor carrier and a non-anchor carrier. The anchor carrier is a carrier that carries a narrow band primary synchronization signal (NPSS), a narrow band secondary synchronization signal (NSSS), a narrowband physical broadcast channel (NPBCH), an NPDCCH, and a narrow band physical downlink shared channel (NPDSCH). The non-anchor carrier is a carrier that carries only an NPDCCH and an NPDSCH, but does not carry an NPSS, an NSSS, or an NPBCH.

The NB-IoT system supports paging on the non-anchor carrier. To reduce overheads of a narrow band reference signal (NRS), near an NPDCCH search space starting from a paging occasion (PO) on the non-anchor carrier, the NRS only exists during paging, and no NRS exists when no paging is performed. Therefore, when a terminal device wakes up at a corresponding PO within a discontinuous reception (DRX) cycle on the non-anchor carrier, to monitor an NPDCCH, the terminal device usually wakes up ahead of time, acquires synchronization on the anchor carrier according to the NPSS and the NSSS, performs radio resource management (RRM) measurement on the anchor carrier according to the NRS or the NSSS, and then switches to a location of the corresponding PO on the non-anchor carrier to monitor the NPDCCH that schedules paging.

Currently, in discussion of NB-IoT Release 16, a network device sends the NRS on some subframes before the PO and some subframes after the PO on the non-anchor carrier. Therefore, the terminal device may also perform RRM measurement on the non-anchor carrier based on the NRS. This helps reduce frequent carrier handover of the terminal device on the anchor carrier and the non-anchor carrier.

However, during RRM measurement, to evaluate whether a cell is a suitable cell, criterion S determining usually needs to be performed. When the terminal device performs RRM measurement on the non-anchor carrier based on the NRS, there is currently no related solution about how to perform criterion S determining.

SUMMARY

Embodiments of this application provide a measurement method, a device, and a system, so that a communications device can perform criterion S determining on a serving cell when performing RRM measurement on a non-anchor carrier.

According to a first aspect, a measurement method is provided. The method includes: A communications device determines a first reference signal received power based on at least one reference signal received power measurement result on a first non-anchor carrier, where the first non-anchor carrier is a carrier on which the communications device receives a paging message from a network device in a serving cell in which the communications device is located; and the communications device performs criterion S determining on the serving cell based on the first reference signal received power. Based on the solution, because the communications device may determine the first reference signal received power based on the at least one reference signal received power measurement result on the first non-anchor carrier and perform criterion S determining on the serving cell based on the first reference signal received power, the communications device can perform criterion S determining on the serving cell when performing RRM measurement on the non-anchor carrier.

In a possible design, that the communications device determines a first reference signal received power based on at least one reference signal received power measurement result on a first non-anchor carrier includes: The communications device determines a second reference signal received power based on a plurality of reference signal received power measurement results on the first non-anchor carrier, where the second reference signal received power is the reference signal received power on the first non-anchor carrier; and the communications device determines the first reference signal received power based on the second reference signal received power, where the first reference signal received power is a reference signal received power on a first anchor carrier, and the first anchor carrier is an anchor carrier of the serving cell. In other words, in this implementation, it is determined that a plurality of reference signal received power measurement results are the plurality of reference signal received power measurement results on the first non-anchor carrier. The plurality of measurement results are not limited to a plurality of adjacent measurement results, and are only required to be spaced from each other by at least a DRX cycle/2.

In a possible design, that the communications device determines the first reference signal received power based on the second reference signal received power includes: The communications device determines the first reference signal received power based on the second reference signal received power and a second power difference of a narrow band reference signal on the first non-anchor carrier relative to the first anchor carrier. For example, the second reference signal received power, the first reference signal received power, and the second power difference meet the following formula: $Q_{rxlevmeas\_anchor} = Q_{rxlevmeas\_non} + \text{nrs-PowerOffsetNonAnchor}$. $Q_{rxlevmeas\_non}$ represents the second reference signal received power, $Q_{rxlevmeas\_anchor}$ represents the first reference signal received power, and nrs-PowerOffsetNonAnchor represents the second power difference.

In a possible design, before the communications device determines the first reference signal received power based on the second reference signal received power, the method further includes: The communications device receives first indication information from the network device, where the first indication information indicates that it is allowed that the first reference signal received power is determined based on the second reference signal received power.

In a possible design, that the communications device determines a first reference signal received power based on at least one reference signal received power measurement result on a first non-anchor carrier includes: The communications device determines, based on m reference signal received power measurement results/result on the first non-anchor carrier, m reference signal received power measurement results/result on a first anchor carrier, where the first anchor carrier is an anchor carrier of the serving cell, and m is a positive integer; and the communications device determines the first reference signal received power based on M−m reference signal received power measurement results/result on the first anchor carrier and the determined m measurement results/result, where the first reference signal received power is a reference signal received power on the first anchor carrier, M is greater than or equal to 2, and M is greater than m. In other words, in this implementation, it is determined that a plurality of reference signal received power measurement results include the reference signal received power measurement result on the first non-anchor carrier and the reference signal received power measurement result on the first anchor carrier. The plurality of measurement results are not limited to a plurality of adjacent measurement results, and are only required to be spaced from each other by at least a DRX cycle/2.

In a possible design, that the communications device determines, based on m reference signal received power measurement results/result on the first non-anchor carrier, m reference signal received power measurement results/result on a first anchor carrier may include: The communications device determines, based on the m reference signal received power measurement results/result on the first non-anchor carrier and a second power difference of an NRS on the first non-anchor carrier relative to the first anchor carrier, the m reference signal received power measurement results/result on the first anchor carrier. For example, using an example in which any reference signal received power measurement result on the first anchor carrier is determined based on any reference signal received power measurement result on the first non-anchor carrier, the reference signal received power measurement result on the first anchor carrier, the reference signal received power measurement result on the first non-anchor carrier, and the second power difference meet the following formula: the reference signal received power measurement result on the first anchor carrier=the reference signal received power measurement result on the first non-anchor carrier+the second power difference.

In a possible design, that the communications device performs criterion S determining on the serving cell based on the first reference signal received power includes: The communications device determines a first received level value based on the first reference signal received power; and the communications device determines that the serving cell meets a criterion S, provided that the first received level value is greater than 0. In other words, in this solution, a step of performing criterion S determining on the serving cell based on first reference signal received quality may be skipped.

In a possible design, that the communications device determines a first reference signal received power based on at least one reference signal received power measurement result on a first non-anchor carrier includes: The communications device determines the first reference signal received power based on a plurality of reference signal received power measurement results on the first non-anchor carrier, where the first reference signal received power is the reference signal received power on the first non-anchor carrier. In other words, in this implementation, it is determined that a plurality of reference signal received power measurement results include the plurality of reference signal received power measurement results on the first non-anchor carrier. In addition, the communications device performs criterion S determining on the serving cell based on the reference signal received power on the first non-anchor carrier.

In a possible design, the method further includes: The communications device determines first reference signal received quality on the first non-anchor carrier based on a plurality of reference signal received quality measurement results on the first non-anchor carrier; and that the communications device performs criterion S determining on the serving cell based on the first reference signal received power includes: The communications device performs determining of criterion S on the serving cell based on the first reference signal received power and the first reference signal received quality, where a configuration parameter in the criterion S is a configuration parameter corresponding to the first non-anchor carrier.

In a possible design, the method further includes: The communications device determines that the serving cell does not meet the criterion S within consecutive N discontinuous reception cycles, where N is a positive integer; and the communications device triggers measurement for a neighboring cell of the serving cell. For example, a value of N may be 2 or 4. For example, the neighboring cell of the serving cell may be all neighboring cells indicated by the serving cell.

In a possible design, the method further includes: The communications device determines that the serving cell does not meet the criterion S within consecutive Q discontinuous reception cycles on the first non-anchor carrier, where Q is a positive integer; and the communications device triggers measurement for a neighboring cell of the serving cell. For example, a value of Q may be 2 or 4. For example, the neighboring cell of the serving cell may be all neighboring cells indicated by the serving cell.

Currently, according to a method (agreement) agreed upon in discussion of RAN 4 R16, when a relaxed monitoring measurement rule is met, the communications device may perform measurement on a non-anchor carrier. A problem lies in that the communications device also needs to determine whether the relaxed monitoring measurement rule is met when performing measurement on the non-anchor carrier. When the relaxed monitoring measurement rule is not met, the communications device cannot continue measurement on the non-anchor carrier. However, there is currently no related solution about how the communications device determines whether the relaxed monitoring measurement rule is met while performing measurement on the non-anchor carrier. To resolve the problem, an embodiment of this application uses the following technical solution.

According to a second aspect, a measurement method is provided. The method includes: A communications device determines a first reference signal received power based on at least one reference signal received power measurement result on a first non-anchor carrier, where the first non-anchor carrier is a carrier on which the communications device receives a paging message from a network device in a serving cell in which the communications device is located; the communications device determines a first received level value based on the first reference signal received power, where the first received level value is a received level value on a first anchor carrier, and the first anchor carrier is an anchor carrier of the serving cell; and the communications device performs relaxed monitoring measurement rule determining on the serving cell based on the first received level value. Based on the solution, the communications device can determine whether the relaxed monitoring measurement rule is met while performing measurement on the non-anchor carrier.

In a possible design, that a communications device determines a first reference signal received power based on at least one reference signal received power measurement result on a first non-anchor carrier includes: The communications device determines a second reference signal received power based on a plurality of reference signal received power measurement results on the first non-anchor carrier, where the second reference signal received power is the reference signal received power on the first non-anchor carrier; and the communications device determines the first reference signal received power based on the second reference signal received power, where the first reference signal received power is a reference signal received power on the first anchor carrier, and the first anchor carrier is an anchor carrier of the serving cell. In other words, in this implementation, it is determined that a plurality of reference signal received power measurement results are the plurality of reference signal received power measurement results on the first non-anchor carrier. The plurality of measurement results are not limited to a plurality of adjacent measurement results, and are only required to be spaced from each other by at least a DRX cycle/2.

In a possible design, that the communications device determines the first reference signal received power based on the second reference signal received power includes: The communications device determines the first reference signal received power based on the second reference signal received power and a second power difference of a narrow band reference signal on the first non-anchor carrier relative to the first anchor carrier. For example, the second reference signal received power, the first reference signal received power, and the second power difference meet the following formula: $Q_{rxlevmeas\_anchor} = Q_{rxlevmeas\_non} + \text{nrs-PowerOffsetNonAnchor}$. $Q_{rxlevmeas\_non}$ represents the second reference signal received power, $Q_{rxlevmeas\_anchor}$ represents the first reference signal received power, and nrs-PowerOffsetNonAnchor represents the second power difference.

In a possible design, before the communications device determines the first reference signal received power based on the second reference signal received power, the method further includes: The communications device receives first indication information from the network device, where the first indication information indicates that it is allowed that the first reference signal received power is determined based on the second reference signal received power.

In a possible design, that a communications device determines a first reference signal received power based on at least one reference signal received power measurement result on a first non-anchor carrier includes: The communications device determines, based on m reference signal received power measurement results/result on the first non-anchor carrier, m reference signal received power measurement results/result on the first anchor carrier, where m is a positive integer; and the communications device determines the first reference signal received power based on M−m reference signal received power measurement results/result on the first anchor carrier and the determined m measurement results/result, where the first reference signal received power is a reference signal received power on the first anchor carrier, M is greater than or equal to 2, and M is greater than m. In other words, in this implementation, it is determined that a plurality of reference signal received power measurement results include the reference signal received power measurement result on the first non-anchor carrier and the reference signal received power measurement result on the first anchor carrier. The plurality of measurement results are not limited to a plurality of adjacent measurement results, and are only required to be spaced from each other by at least a DRX cycle/2.

In a possible design, that the communications device determines, based on m reference signal received power measurement results/result on the first non-anchor carrier, m reference signal received power measurement results/result on the first anchor carrier may include: The communications device determines, based on the m reference signal received power measurement results/result on the first non-anchor carrier and a second power difference of an NRS on the first non-anchor carrier relative to the first anchor carrier, the m reference signal received power measurement results/result on the first anchor carrier. For example, using an example in which any reference signal received power measurement result on the first anchor carrier is determined based on any reference signal received power measurement result on the first non-anchor carrier, the reference signal received power measurement result on the first anchor carrier, the reference signal received power measurement result on the first non-anchor carrier, and the second power difference meet the following formula: the reference signal received power measurement result on the first anchor carrier=the reference signal received power measurement result on the first non-anchor carrier+the second power difference.

In a possible design, that a communications device determines a first reference signal received power based on at least one reference signal received power measurement result on a first non-anchor carrier includes: The communications device determines the first reference signal received power based on a plurality of reference signal received power measurement results on the first non-anchor carrier, where the first reference signal received power is the reference signal received power on the first non-anchor carrier. In other words, in this implementation, it is determined that a plurality of reference signal received power measurement results include the plurality of reference signal received power measurement results on the first non-anchor carrier.

In a possible design, that the communications device determines a first received level value based on the first reference signal received power includes: The communications device determines a second received level value based on the first reference signal received power and a criterion S, where the second received level value is a received level value on the first non-anchor carrier, and a configuration parameter in the criterion S is a configuration parameter corresponding to the first non-anchor carrier; and the communications device determines the first received level value based on the second received level value. Based on the solution, the reference signal received power on the first non-anchor carrier can be converted into the received level value on the first anchor carrier.

In a possible design, that the communications device determines the first received level value based on the second received level value includes: The communications device determines the first received level value based on the second received level value and a first power difference on the first non-anchor carrier relative to the first anchor carrier.

In a possible design, the first power difference, the second received level value, and the first received level value meet the following formula: the first received level value=the second received level value+the first power difference.

In a possible design, the method further includes: The communications device receives third indication information from the network device, where the third indication information is used to indicate the first power difference.

However, the first power difference may alternatively be configured in a protocol. This is not specifically limited in this embodiment of this application.

With reference to the first aspect or the second aspect, in a possible design, a time interval between any two measurements of the reference signal received power among measurements of the reference signal received power on the first non-anchor carrier is less than or equal to a first value.

With reference to the first aspect or the second aspect, in a possible design, the method further includes: The communications device receives second indication information from the network device, where the second indication information is used to indicate the first value. However, the first value may alternatively be configured in a protocol. This is not specifically limited in this embodiment of this application.

According to a third aspect, a communications device is provided, to implement the foregoing methods. The communications device includes a corresponding module, unit, or means for implementing the foregoing method. The module, unit, or means may be implemented by using hardware or software, or implemented by hardware executing corresponding software. The hardware or the software includes one or more modules or units corresponding to the foregoing functions.

According to a fourth aspect, a communications device is provided. The communications device includes a processor and a memory, where the memory is configured to store computer instructions, and when the processor executes the instructions, the communications device is enabled to perform the method according to any one of the foregoing aspects.

According to a fifth aspect, a communications device is provided, and includes a processor. The processor is configured to: after being coupled to a memory and reading instructions in the memory, perform, according to the instructions, the method according to any one of the foregoing aspects.

With reference to any one of the third aspect to the fifth aspect, in a possible design, the communications device may be a chip or a chip system. When the communications device is a chip system, the communications device may include a chip or include a chip and another discrete device.

According to a sixth aspect, a computer-readable storage medium is provided. The computer-readable storage medium stores instructions, and when the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

For technical effects brought by any one of the designs of the third aspect to the seventh aspect, refer to technical effects brought by different designs of the first aspect or the second aspect. Details are not described herein again.

According to an eighth aspect, a communications system is provided. The communications system includes a network device and a communications device. The network device is configured to send a reference signal to the communications device. The communications device is configured to receive the reference signal from the network device and perform the measurement method according to the first aspect or the second aspect.

DESCRIPTION OF EMBODIMENTS

For ease of understanding embodiments of this application, brief descriptions or definitions of related technologies are first provided as follows:

In a wireless communications system, a terminal device has two modes. One is a connected mode, which indicates that the terminal device has established a connection to a network device and can directly perform communication. One is an idle mode, or referred to as a sleep mode, which indicates that the terminal device cannot directly communicate with the network device. When the terminal device has no service data to send or receive, the terminal device may enter the idle mode to reduce power consumption. When the network device needs to send service data to the terminal device or requires the terminal device to report some service data, the network device may notify the terminal device by using a paging mechanism. The terminal device in the idle mode periodically wakes up to monitor a physical downlink control channel (PDCCH), and detects whether a paging scheduling message exists in the PDCCH. If a paging scheduling message exists and paging scheduling is specific to the terminal device, the terminal device in the idle mode switches to the connected mode, to send or receive service data.

Currently, the terminal device in an idle mode needs to perform RRM measurement on an anchor carrier, and a measurement result is mainly used by a cell on a terminal device side for selection, cell reselection, uplink power control, and the like.

The terminal device needs to perform criterion S determining when evaluating whether a cell is a suitable cell. A reference signal received power (RSRP) (also referred to as a received level value) and reference signal received quality (RSRQ) (also referred to as a quality value) that are to be measured are used during criterion S determining. An example in which the RSRP is a narrow band RSRP (NRSRP), and the RSRQ is a narrow band RSRQ (NRSRQ) is used in all the following examples for description.

First, definitions of the NRSRP and the NRSRQ may be as follows:

The NRSRP is linear average of a power of a resource element carrying an NRS in measurement bandwidth.

The NRSRQ=the NRSRP/a narrowband received signal strength indicator (NRSSI). The NRSRP and the NRSSI are results obtained through measurement on a same resource. The NRSSI is a linear average value of a total received power for measuring all orthogonal frequency division multiplexing (OFDM) symbols on a subframe in measurement bandwidth.

Second, the NRSRP and the NRSRQ may be determined based on the following method.

Figure 1A:
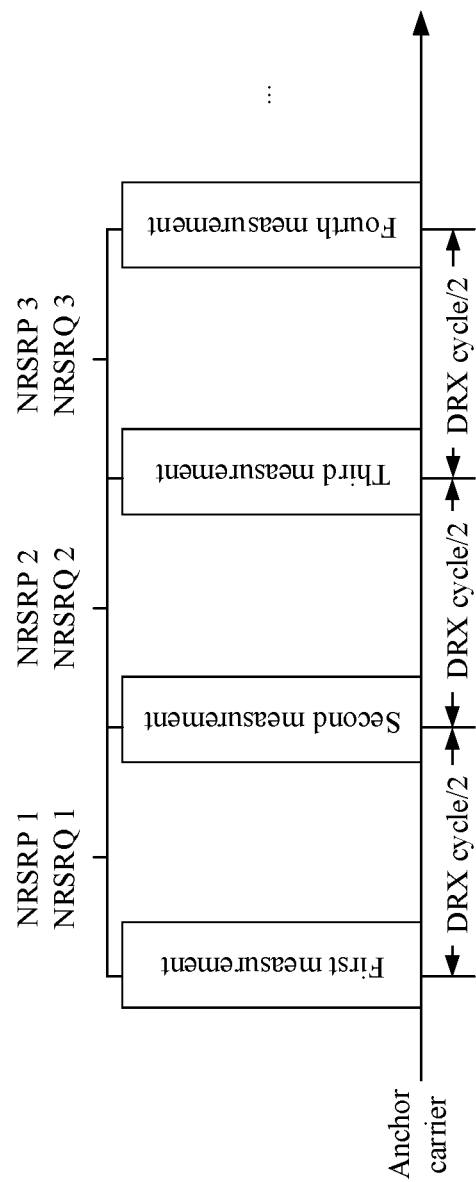
FIG. 1a is a schematic diagram 1 of a method for determining an NRSRP and an NRSRQ according to an embodiment of this application.

The NRSRP and the NRSRQ are obtained through filtering based on at least two measurement results, and the at least two measurement results need to be spaced from each other by at least a DRX cycle/2, as shown in FIG. 1a. An example of performing filtering based on two measurement results is used in FIG. 1a, and an example in which the two measurement results are spaced from each other by the DRX cycle/2 is used. An NRSRP 1 and an NRSRQ 1 are obtained based on a first measurement result and a second measurement result, and an NRSRP 2 and an NRSRQ 2 are obtained based on the second measurement result and a third measurement result. The rest can be deduced by analogy.

After obtaining the NRSRP and the NRSRQ, the terminal device needs to perform determining of a criterion S on a serving cell in which the terminal device is located. A criterion S is a basic condition for the terminal device to camp on a current cell and is specifically as follows:

A cell selection criterion S is met when $$Srxlev > 0$$

and $$Squal > 0,$$

$$Srxlev = Qrxlevmeas - Qrxlevmin - Pcompensation - Qoffsettemp,$$

and $$Squal = Qqualmeas - Qqualmin - Qoffsettemp.$$

Physical meanings of the parameters are shown in Table 1.

TABLE 1

| | |
|---|---|
| Srxlev | Calculated cell received level value, used to determine whether the serving cell meets the criterion S |
| Squal | Calculated cell quality value, used to determine whether the serving cell meets the criterion S |
| Qoffsettemp | Punitive offset, configured by a higher layer |
| Qrxlevmeas | NRSRP measured by the terminal device, and also referred to as a cell received level value measured by the terminal device |
| Qqualmeas | NRSRQ measured by the terminal device, and also referred to as a cell quality value measured by the terminal device |
| Qrxlevmin | Smallest received level value that meets a cell selection condition, and configured by a higher layer |

TABLE 1-continued

| | |
|---|---|
| Qqualmin | Smallest quality value that meets a cell selection condition, and configured by a higher layer |
| Pcompensation | Compensations made for different largest transmit powers supported by different UEs, and determined by $P_{EMAX1}$, $P_{EMAX2}$, AND $P_{PowerClass}$ |
| Srxlev | Calculated cell received level value, used to determine whether the serving cell meets the criterion S |
| $P_{EMAX1}$, $P_{EMAX2}$ | Level of a largest transmit power value that is allowed by a network and that is of the terminal device, and configured by a higher layer |
| $P_{PowerClass}$ | Level of a largest radio frequency output power of the terminal device, and inherent feature of the terminal device |

Herein, a configuration parameter in the criterion S is a cell-specific configuration parameter.

The terminal device needs to evaluate the criterion S within each DRX cycle. When the serving cell does not meet the cell selection criterion S within consecutive N DRX cycles, regardless of whether a terminal device measurement restriction criterion is met, the terminal device triggers measurement that is indicated by the serving cell and that is for all neighboring cells, to search for a new cell that is suitable for camping on. A value of N is related to a coverage level of the terminal device. When the terminal device is normal coverage, N=2. When the terminal device is enhanced coverage, N=4.

The terminal device measurement restriction criterion is as follows: If the serving cell meets $Srxlev > S_{IntraSearchP}$, the terminal device may not perform intra-frequency measurement, that is, the terminal device may not measure an intra-frequency neighboring cell. Otherwise, the terminal device needs to perform intra-frequency measurement, that is, the terminal device needs to measure an intra-frequency neighboring cell. If the serving cell meets $Srxlev > S_{nonIntraSearchP}$, the terminal device may not perform inter-frequency measurement, that is, the terminal device may not measure an inter-frequency neighboring cell. Otherwise, the terminal device needs to perform inter-frequency measurement, that is, the terminal device needs to measure an inter-frequency neighboring cell. $S_{IntraSearchP}$ and $S_{nonIntraSearchP}$ are parameters configured by the serving cell in a system message.

In other words, a behavior of the terminal device in an idle mode is measuring the NRSRP and the NRSRQ of the serving cell, and performing calculation according to a formula for the criterion S to determine whether the serving cell meets the criterion S. If the terminal device determines, based on the formula for the criterion S, that the serving cell meets the criterion S. Srxlev obtained through calculation is further used to determine whether the terminal device measurement restriction criterion is met. If the terminal device measurement restriction criterion is met, intra-frequency measurement and/or inter-frequency measurement does not need to be performed, that is, the terminal device does not need to measure an intra-frequency neighboring cell and/or an inter-frequency neighboring cell. If the terminal device measurement restriction criterion is not met, intra-frequency measurement and/or inter-frequency measurement needs to be performed, that is, the terminal device needs to measure an intra-frequency neighboring cell and/or an inter-frequency neighboring cell. When the serving cell does not meet the cell selection criterion S within consecutive N DRX cycles, regardless of whether the terminal device measurement restriction criterion is met, the terminal device triggers measurement that is indicated by the serving cell and that is for all neighboring cells, to search for a new cell that is suitable for camping on.

In discussion of NB-IoT Release 15, to further reduce power consumption for measurement of the terminal device, measurement relaxation optimization is performed. If the terminal device supports measurement relaxation, and a threshold s-SearchDeltaP is configured in a system information block (SIB) 3, the terminal device may further perform relaxed monitoring measurement rule (relaxed monitoring measurement rules) determining on the serving cell. When the terminal device determines, according to the terminal device measurement restriction criterion, that intra-frequency measurement and/or inter-frequency measurement needs to be performed, the relaxed monitoring measurement rule is that when the terminal device meets the following three conditions, the terminal device may not perform intra-frequency measurement and/or inter-frequency measurement.

Condition 1: The following relaxed monitoring criterion is met for $T_{SearchDeltaP}$, and $T_{SearchDeltaP}$ is a parameter configured by a network or a parameter stipulated in a protocol.

Condition 2: There are less than 24 hours away from last cell reselection measurement.

Condition 3: After selecting or reselecting a cell, the terminal device has performed intra-frequency measurement or inter-frequency measurement at least for $T_{SearchDeltaP}$.

The relaxed monitoring criterion in the condition 1 is as follows:

The relaxed monitoring criterion is met when:

$$(Srxlev_{Ref} - Srxlev) < s\text{-}SearchDeltaP,$$

where Srxlev is a current Srxlev value of the serving cell (dB).

$Srxlev_{Ref}$ is a reference Srxlev value of the serving cell (dB), and is set as follows:

after a new cell is selected or reselected (after selecting or reselecting a new cell); or if $(Srxlev - Srxlev_{Ref}) > 0$; or if the relaxed monitoring criterion is not met for $T_{SearchDeltaP}$ (if the relaxed monitoring criterion has not been met for $T_{SearchDeltaP}$);

the terminal device sets the value of $Srxlev_{Ref}$ to the current Srxlev value of the serving cell (the UE shall set the value of $Srxlev_{Ref}$ to the current Srxlev value of the serving cell);

$T_{SearchDeltaP}$ is 5 minutes, or $T_{SearchDeltaP}$ is an eDRX cycle length if eDRX is configured, and the eDRX cycle length is longer than 5 minutes ($T_{SearchDeltaP}=5$ minutes, or the eDRX cycle length if eDRX is configured and the eDRX cycle length is longer than 5 minutes).

Figure 1B:
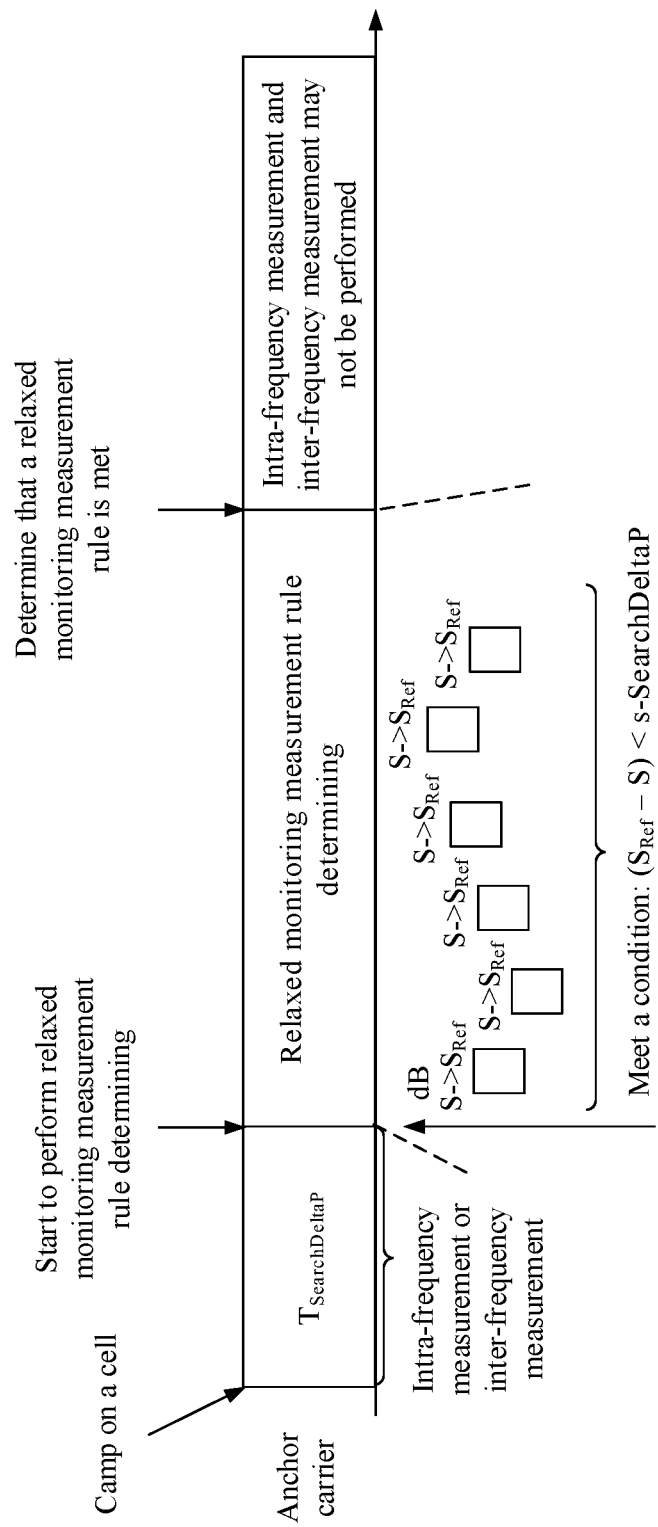
FIG. 1b is a schematic diagram of an existing process of determining a relaxed monitoring measurement rule.

For example, a process of determining the relaxed monitoring measurement rule may be shown in FIG. 1b. Specifically, after camping on a cell, the terminal device has performed intra-frequency measurement or inter-frequency measurement on an anchor carrier at least for $T_{SearchDeltaP}$ (≥5 minutes), so that the terminal device starts to perform relaxed monitoring measurement rule determining on the serving cell. When determining that the serving cell meets the relaxed monitoring measurement rule, the terminal device may not perform intra-frequency measurement and inter-frequency measurement. In a process in which the terminal device performs relaxed monitoring measurement rule determining on the serving cell, the relaxed monitoring measurement rule meets $(Srxlev_{Ref}-Srxlev)<s\text{-}SearchDeltaP$. In addition, when it is determined that the serving cell does not meet the relaxed monitoring measurement rule, $Srxlev_{Ref}$ needs to be updated to Srxlev. In other words, update is performed once every measurement. It should be noted that for simplified illustration, in FIG. 1b, Srxlev is referred to as S for short, and $Srxlev_{Ref}$ is referred to as $S_{Ref}$ for short. Unified descriptions are provided herein, and details are not described again below.

The following describes embodiments of this application with reference to the accompanying drawings in the embodiments of this application. Unless otherwise specified, "/" in descriptions of this application represents an "or" relationship between associated objects. For example, A/B may represent A or B. A and B may be singular or plural. In addition, in the descriptions of this application, "a plurality of" means two or more than two, unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe embodiments of this application, terms such as "first" and "second" are used in the embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference. In addition, in the embodiments of this application, the word such as "example" or "for example" is used to represent giving an example, an illustration, or a description. Any embodiment or design scheme described as "in an example" or "for example" in the embodiments of this application should not be explained as being more preferred or having more advantages than another embodiment or design scheme. Exactly, use of the word "example", "for example", or the like is intended to present a relative concept in a specific manner for ease of understanding.

Figure 2:
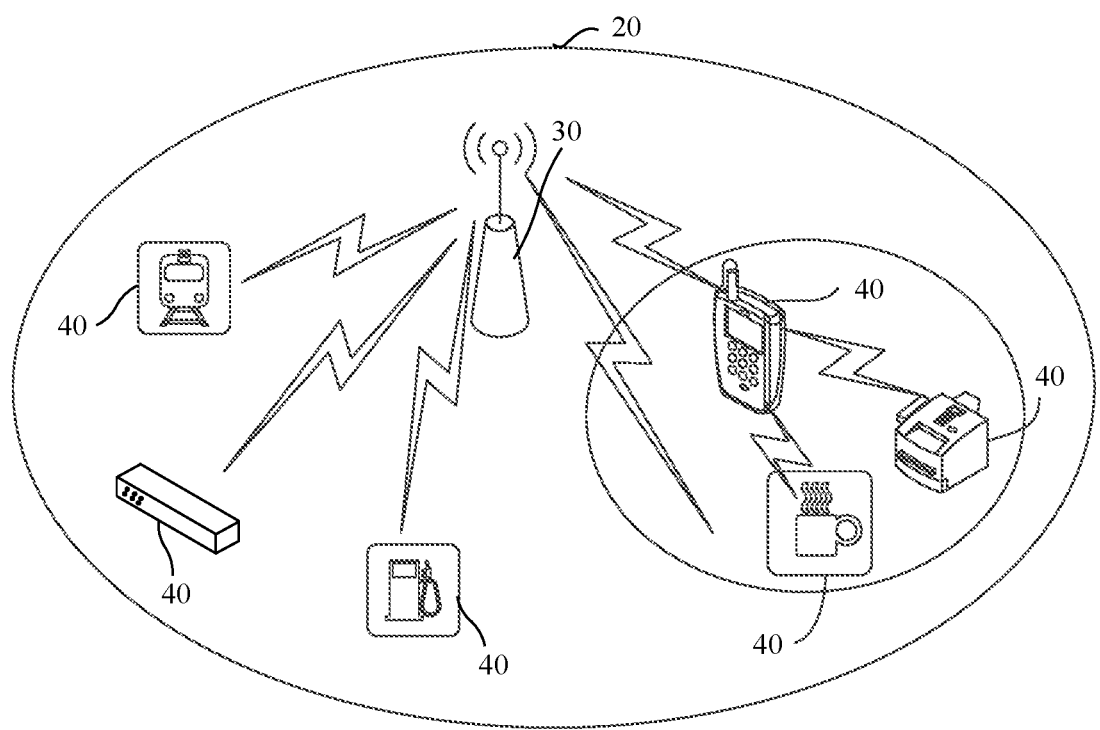
FIG. 2 is a schematic diagram of a structure of a communications system according to an embodiment of this application.

Embodiments of the present disclosure are applicable to various communications systems, for example, are applicable to a long term evolution (LTE) system, such as an NB-IoT system or an enhanced machine type communications (eMTC) system, and are also applicable to another wireless communications system, such as a global system for mobile communications (GSM) system, a mobile communications system (UMTS) system, a code division multiple access (CDMA) system, or a 5th generation (5G) system, and a future-oriented communications system. This is not specifically limited in the embodiments of this application. In the embodiments of this application, terms "system" and "network" may be interchanged with each other. Unified descriptions are provided herein, and details are not described again below;

FIG. 2 shows a communications system 20 according to an embodiment of this application. The communications system 20 includes a network device 30 and one or more communications devices 40 connected to the network device 30. Optionally, different communications devices 40 may communicate with each other.

An example in which the network device 30 shown in FIG. 2 interacts with any communications device 40 is used. In this embodiment of this application, the network device 30 sends a reference signal to the communications device 40. The communications device 40 determines a first reference signal received power based on at least one reference signal received power measurement result on a first non-anchor carrier. The first non-anchor carrier is a carrier on which the communications device receives a paging message from the network device in a serving cell in which the communications device is located. Further, the communications device 40 performs criterion S determining on the serving cell based on the first reference signal received power. Specific implementation of the solution is to be described in subsequent method embodiments. Details are not described herein. Based on the solution, because the communications device may determine the first reference signal received power based on the at least one reference signal received power measurement result on the first non-anchor carrier and perform criterion S determining on the serving cell based on the first reference signal received power, the communications device can perform criterion S determining on the serving cell when performing RRM measurement on the non-anchor carrier.

Optionally, the network device 30 in this embodiment of this application is a device for connecting the communications device 40 to a wireless network, and may be an evolved NodeB (evolutional NodeB, eNB or eNodeB) in long term evolution (LTE), a base transceiver station (BTS) in GSM or CDMA, a NodeB in a WCDMA system, a base station in a 5th generation (5G) network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in this embodiment of this application may include base stations in various forms, for example, a macro base station, a micro base station (also referred to as a small cell), a relay station, and an access point. This is not specifically limited in this embodiment of this application.

Optionally, the communications device 40 in this embodiment of this application may be a device configured to implement a wireless communication function, such as a terminal (which may also be referred to as a terminal device) or a chip that can be used in a terminal. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, a vehicle-mounted device, or a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device 30 and the communications device 40 in this embodiment of this application may also be referred to as communications apparatuses, and each may be a general-purpose device or a dedicated device. This is not specifically limited in this embodiment of this application.

Figure 3:
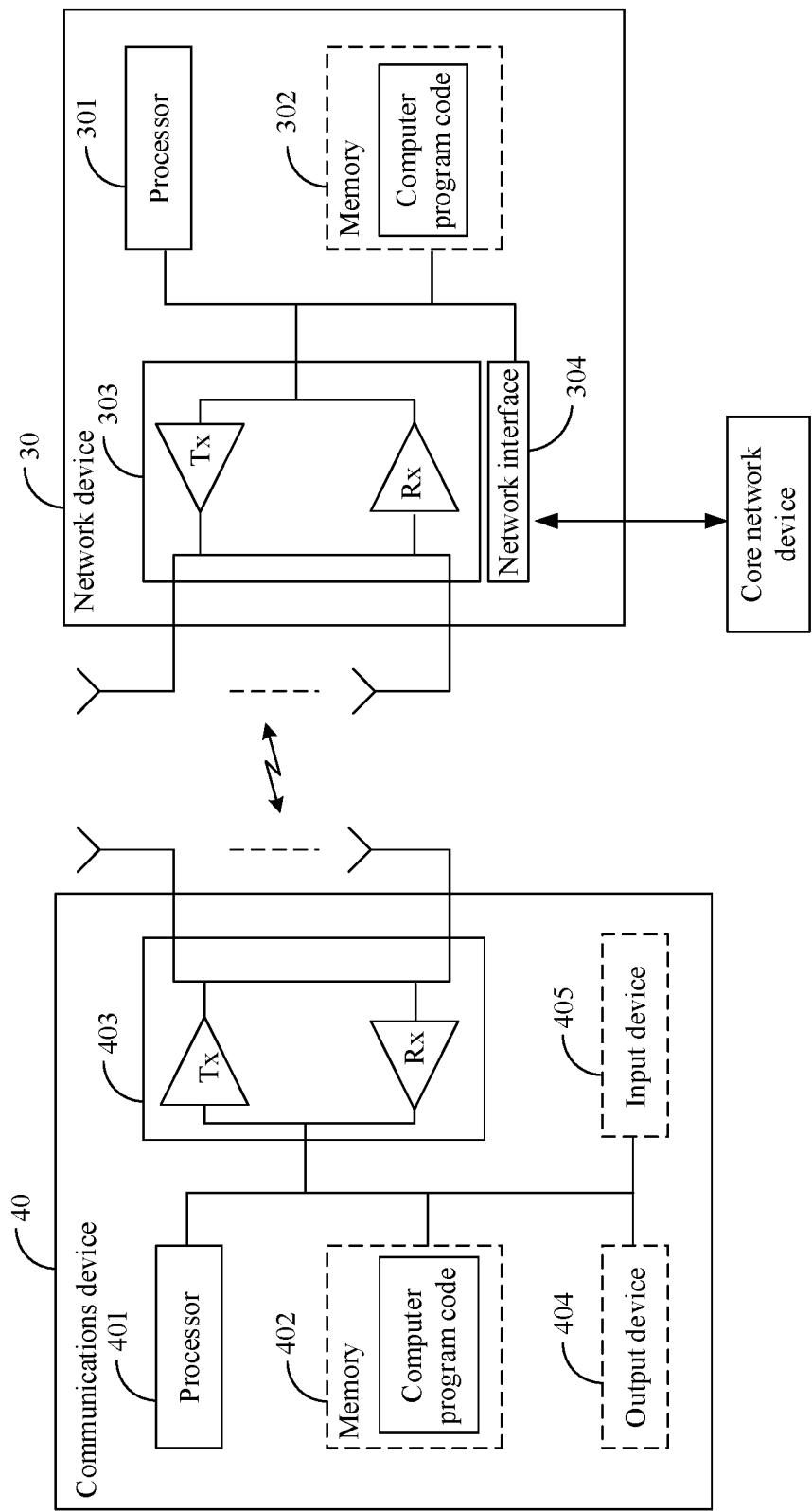
FIG. 3 is a schematic diagram of structures of a communications device and a network device according to an embodiment of this application.

Optionally, FIG. 3 is a schematic diagram of structures of the network device 30 and the communications device 40 according to an embodiment of this application.

The communications device 40 includes at least one processor (an example in which one processor 401 is included is used for description in FIG. 3) and at least one transceiver (an example in which one transceiver 403 is included is used for description in FIG. 3). Optionally, the communications device 40 may further include at least one memory (an example in which the communications device 40 includes one memory 402 is used for description in FIG. 3), at least one output device (an example in which the communications device 40 includes one output device 404 is used for description in FIG. 3), and at least one input device (an example in which the communications device 40 includes one input device 405 is used for description in FIG. 3).

The processor 401, the memory 402, and the transceiver 403 are connected to each other through a communications line. The communications line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. In specific implementation, in an embodiment, the processor 401 may also include a plurality of CPUs, and the processor 401 may be a single-core (single-CPU) processor or a multi-core (multi-CPU) processor. The processor herein may be one or more devices, circuits, and/or processing cores configured to process data (for example, computer program instructions).

The memory 402 may be an apparatus having a storage function. For example, the memory 402 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory 402 is not limited thereto. The memory 402 may exist independently, and is connected to the processor 401 through the communications line. Alternatively, the memory 402 may be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the data scheduling method provided in the embodiments of this application.

Alternatively, optionally, in this embodiment of this application, the processor 401 may perform related processing functions in the data scheduling method provided in the following embodiments of this application. The transceiver 403 is responsible for communicating with another device or another communications network. This is not specifically limited in this embodiment of this application.

Optionally, the computer-executable instructions in this embodiment of this application may also be referred to as application program code or computer program code. This is not specifically limited in this embodiment of this application.

The transceiver 403 may be any type of apparatus using a transceiver, and is configured to communicate with another device or a communications network, for example, the Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which one processor 301 is included is used for description in FIG. 3), at least one transceiver (an example in which one transceiver 303 is included is used for description in FIG. 3), and at least one network interface (an example in which one network interface 304 is included is used for description in FIG. 3). Optionally, the network device 30 may further include at least one memory (an example in which one memory 302 is included is used for description in FIG. 3). The processor 301, the memory 302, the transceiver 303, and the network interface 304 are connected through a communications line. The network interface 304 is configured to connect to a core network device through a link (for example, an SI interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the communications device 40. Details are not described again herein.

With reference to the schematic diagram of the structure of the communications device 40 shown in FIG. 3, an example in which the communications device 40 is the terminal device is used. For example, FIG. 4 is a specific structure form of the terminal device according to an embodiment of this application.

Figure 4:
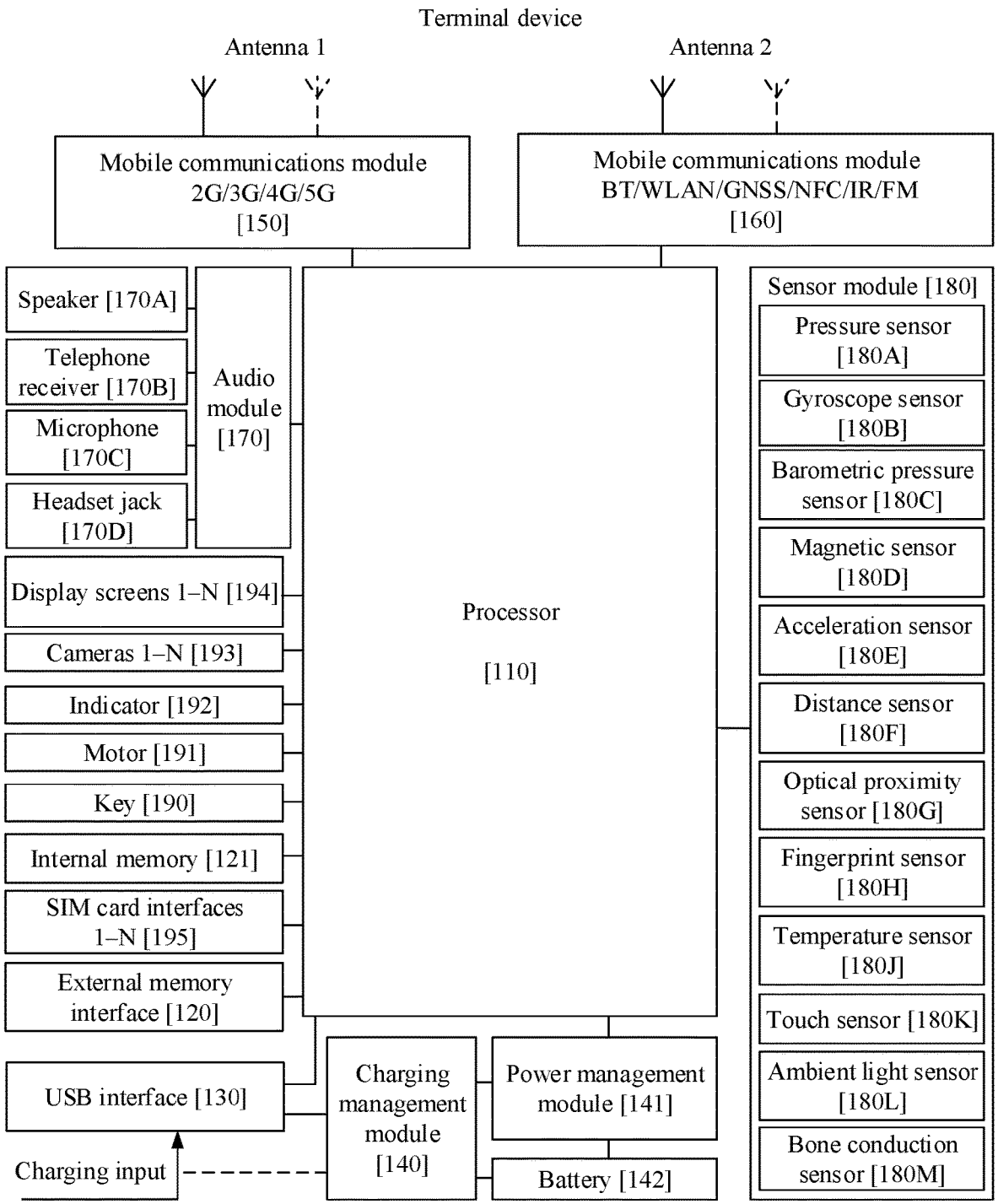
FIG. 4 is a schematic diagram of a structure of a terminal device according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communications module 150, a wireless communications module 160, or the like in FIG. 4.

The antenna 1 and the antenna 2 are configured to transmit and receive electromagnetic wave signals. Each antenna in the terminal device may be configured to cover one or more communications frequency bands. Different antennas may be further multiplexed, to improve antenna utilization. For example, the antenna 1 may be multiplexed as a diversity antenna in a wireless local region network. In some other embodiments, an antenna may be used in combination with a tuning switch.

The mobile communications module 150 may provide a wireless communications solution used in the terminal device and including wireless communication of 2G, 3G, 4G, 5G, and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a solution that is applied to the terminal device and that is for wireless communication such as a wireless local area network (WLAN) (for example, a Wi-Fi network), Bluetooth (BT), a global navigation satellite system (GNSS), frequency modulation (FM), near field communication (NFC), or an infrared (IR) technology. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2. When the terminal device is a first device, that the wireless communications module 160 may provide a solution used for NFC wireless communication on the terminal device means that the first device includes an NFC chip. The NFC chip can improve an NFC wireless communication function. When the terminal device is a second device, that the wireless communications module 160 may provide a solution used for NFC wireless communication on the terminal device means that the first device includes an electronic label (such as a radio frequency identification (RFID) label). If an NFC chip of another device is close to the electronic label, the another device may perform NFC wireless communication with the second device.

In some embodiments, the antenna 1 of the terminal device is coupled to the mobile communications module 150, and the antenna 2 is coupled to the wireless communications module 160, so that the terminal device can communicate with a network and other devices through a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 402 in FIG. 3 may be implemented by using an internal memory 121, an external memory (for example, a Micro SD card) connected to an external memory interface 120 in FIG. 4, or the like.

In some embodiments, a function of the output device 404 in FIG. 3 may be implemented by using a display screen 194 in FIG. 4. The display screen 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, or a bone conduction sensor 180M. This is not specifically limited in this embodiment of this application.

In some embodiments, as shown in FIG. 4, the terminal device may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "microphone"), a headset jack 170D, or the like. This is not specifically limited in this embodiment of this application.

It may be understood that the structure shown in FIG. 4 does not constitute a specific limitation on the terminal device. For example, in some other embodiments of this application, the terminal device may include more or fewer components than those shown in the figure, or some components may be combined, or some components may be split, or the components may be differently arranged. The components shown in the figure may be implemented by using hardware, software, or a combination of software and hardware.

A measurement method provided in an embodiment of this application is described in detail below with reference to FIG. 2 to FIG. 4 and by using an example in which the network device 30 shown in FIG. 2 interacts with any communications device 40.

It should be noted that names of messages between network elements, names of parameters in the messages, or the like in the following embodiments of this application are merely examples, and there may be other names in specific implementation. This is not specifically limited in the embodiments of this application.

Figure 5:
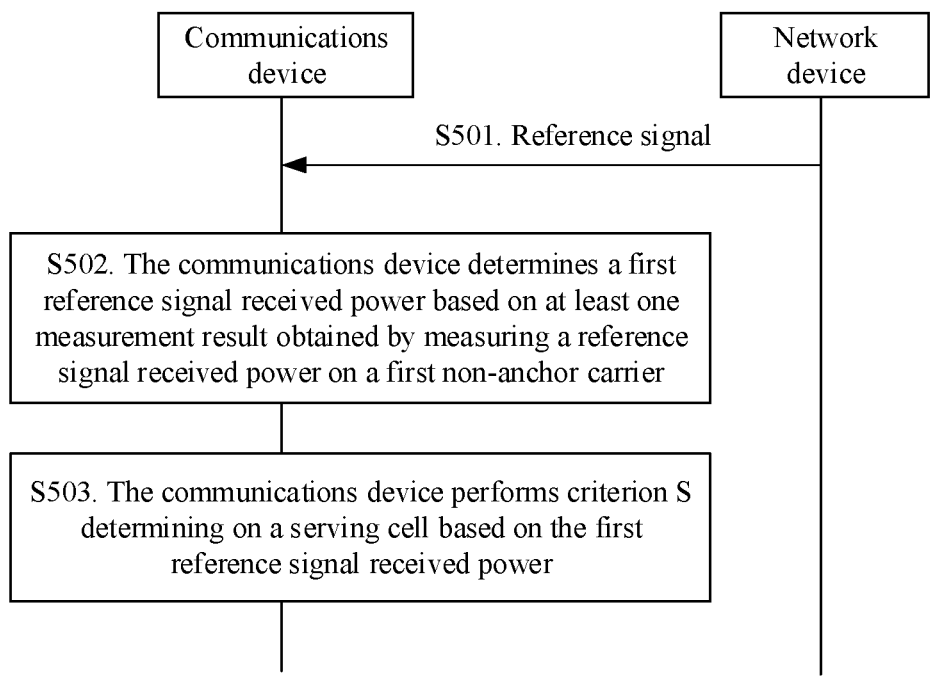
FIG. 5 is a schematic flowchart of a measurement method according to an embodiment of this application.

FIG. 5 shows a measurement method according to an embodiment of this application. The measurement method includes the following steps.

S501: A network device sends a reference signal to a communications device. Correspondingly, the communications device receives the reference signal from the network device.

S502: The communications device determines a first reference signal received power based on at least one reference signal received power measurement result on a first non-anchor carrier, where the first non-anchor carrier is a carrier on which the communications device receives a paging message from the network device in a serving cell in which the communications device is located.

S503: The communications device performs criterion S determining on the serving cell based on the first reference signal received power.

In steps S501 to S503:

In a possible implementation, the network device sends the reference signal to the communications device on the first non-anchor carrier. Correspondingly, the communications device receives the reference signal from the network device on the first non-anchor carrier. Further, that the communications device determines a first reference signal received power based on at least one reference signal received power measurement result on a first non-anchor carrier includes: The communications device determines a second reference signal received power based on a plurality of reference signal received power measurement results on the first non-anchor carrier, where the second reference signal received power is the reference signal received power on the first non-anchor carrier; and the communications device determines the first reference signal received power based on the second reference signal received power, where the first reference signal received power is a reference signal received power on a first anchor carrier, and the first anchor carrier is an anchor carrier of the serving cell.

In other words, in this implementation, it is determined that a plurality of reference signal received power measurement results are the plurality of reference signal received power measurement result on the first non-anchor carrier. The plurality of measurement results are not limited to a plurality of adjacent measurement results, and are only required to be spaced from each other by at least a DRX cycle/2.

Figure 6:
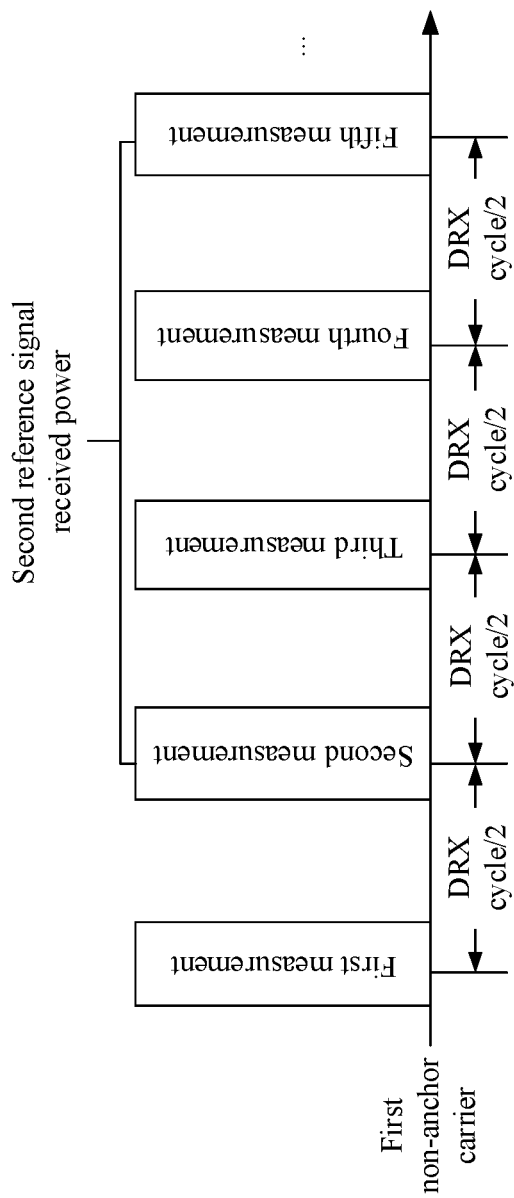
FIG. 6 is a schematic diagram of a method for determining a second reference signal received power according to an embodiment of this application.

An example in which the plurality of measurement results are two measurement results is used. For example, as shown in FIG. 6, the communications device may determine the second reference signal received power based on a second measurement result and a fifth measurement result that are obtained by measuring the reference signal received power on the first non-anchor carrier.

Optionally, in this embodiment of this application, that the communications device determines the first reference signal received power based on the second reference signal received power may include: The communications device determines the first reference signal received power based on the second reference signal received power and a second power difference of a narrow band reference signal (NRS) on the first non-anchor carrier relative to the first anchor carrier.

For example, the second reference signal received power, the first reference signal received power, and the second power difference meet the following formula:

$Q_{rxlevmeas\_anchor} = Q_{rxlevmeas\_non} + \text{nrs-PowerOffsetNonAnchor}$. $Q_{rxlevmeas\_non}$ represents the second reference signal received power, $Q_{rxlevmeas\_anchor}$ represents the first reference signal received power, and nrs-PowerOffsetNonAnchor represents the second power difference.

Optionally, the second power difference herein may be indicated by using indication information sent by the network device to the communications device or may be configured in a protocol. This is not specifically limited in this embodiment of this application. Optionally, the indication information may be configured by using one or more of system message signaling, radio resource control (RRC) signaling, or downlink control information (DCI) signaling. A type of signaling that is used to configure a parameter of the second power difference is not specifically limited in this embodiment of this application.

Optionally, in this implementation, the network device may further send first indication information to the communications device. The first indication information indicates that it is allowed that the first reference signal received power is determined based on the second reference signal received power. Further, after receiving the first indication information, the communications device may determine the first reference signal received power based on the second reference signal received power, and perform criterion S determining on the serving cell based only on the first reference signal received power, but skips a step of performing criterion S determining on the serving cell based on first reference signal received quality.

Optionally, in this embodiment of this application, when the network device configures the first indication information, the first indication information may be configured based on a capability of the communications device, and may be transmitted through broadcasting in a system message. This is not specifically limited in this embodiment of this application.

Certainly, in this implementation, the communications device may alternatively perform criterion S determining on the serving cell based on the capability of the communications device and based only on the first reference signal received power, but skips the step of performing criterion S determining on the serving cell based on the first reference signal received quality, and does not need the first indication information configured by the network device. This is not specifically limited in this embodiment of this application.

In another possible implementation, the network device sends the reference signal to the communications device on the first non-anchor carrier and the first anchor carrier. Correspondingly, the communications device receives the reference signal from the network device on the first non-anchor carrier and the first anchor carrier. Further, that the communications device determines a first reference signal received power based on at least one reference signal received power measurement result on a first non-anchor carrier includes: The communications device determines, based on m reference signal received power measurement results/result on the first non-anchor carrier, m reference signal received power measurement results/result on a first anchor carrier, where the first anchor carrier is an anchor carrier of the serving cell, and m is a positive integer; and the communications device determines the first reference signal received power based on M−m reference signal received power measurement results/result on the first anchor carrier and the determined m measurement results/result, where the first reference signal received power is a reference signal received power on the first anchor carrier. M is greater than or equal to 2, and M is greater than m.

In other words, in this implementation, it is determined that a plurality of reference signal received power measurement results include the reference signal received power measurement result on the first non-anchor carrier and the reference signal received power measurement result on the first anchor carrier. The plurality of measurement results are not limited to a plurality of adjacent measurement results, and are only required to be spaced from each other by at least a DRX cycle/2.

Figure 7:
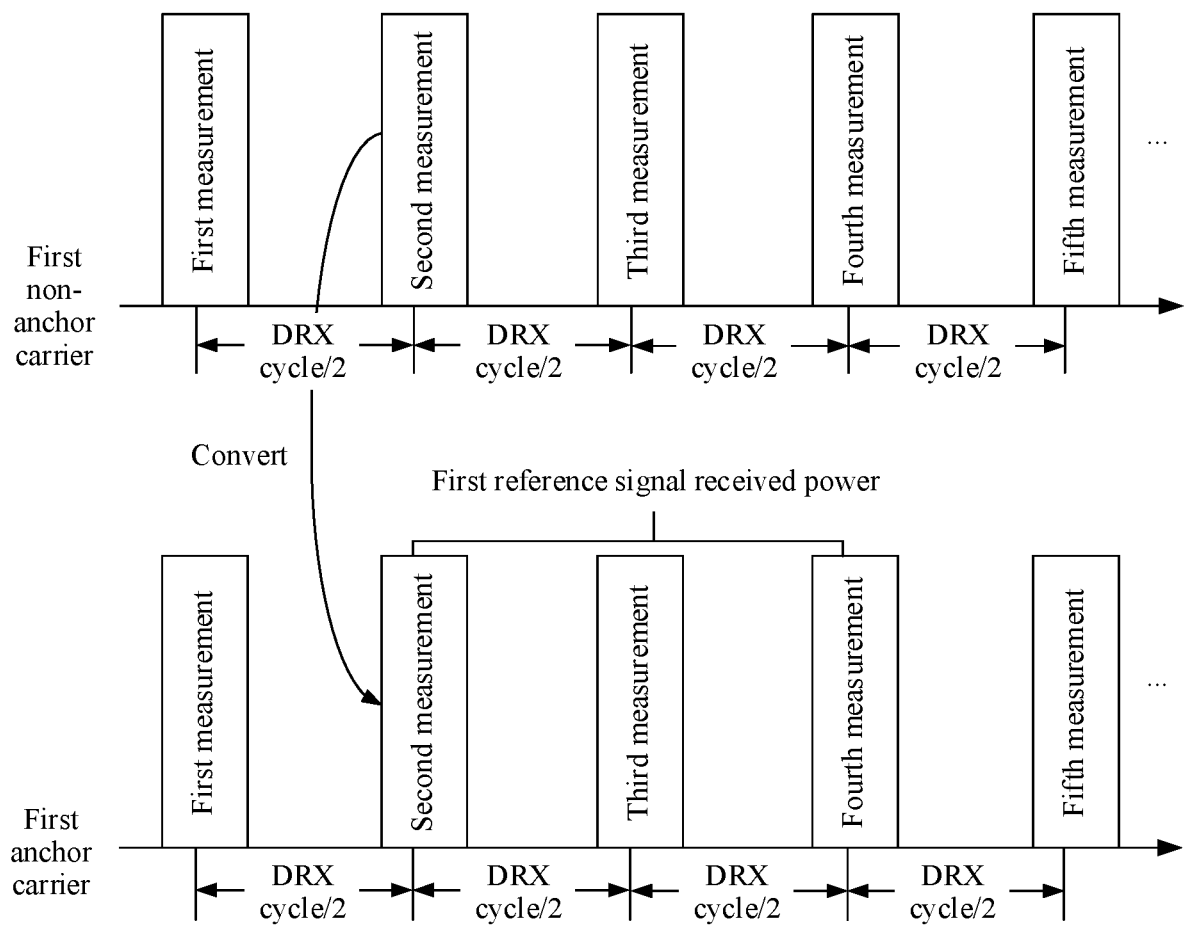
FIG. 7 is a schematic diagram 1 of a method for determining a first reference signal received power according to an embodiment of this application.

An example in which the plurality of measurement results are two measurement results is used. For example, as shown in FIG. 7, the communications device may determine the first reference signal received power based on a fourth reference signal received power measurement result on the first anchor carrier and a second reference signal received power measurement result on the first anchor carrier and that is determined by a second reference signal received power measurement result on the first non-anchor carrier. For example, the first reference signal received power is obtained through filtering in FIG. 1a.

Optionally, M in this embodiment of this application may be a quantity of measurements configured by the network device or may be a specific value stipulated in a protocol. The quantity of measurements may be a smallest quantity of measurements that are needed or may be greater than a smallest quantity of measurements that are needed. This is not specifically limited in this embodiment of this application.

Optionally, in this embodiment of this application, that the communications device determines, based on m reference signal received power measurement results/result on the first non-anchor carrier, m reference signal received power measurement results/result on a first anchor carrier may include: The communications device determines, based on the m reference signal received power measurement results/result on the first non-anchor carrier and a second power difference of an NRS on the first non-anchor carrier relative to the first anchor carrier, the m reference signal received power measurement results/result on the first anchor carrier.

For example, using an example in which any reference signal received power measurement result on the first anchor carrier is determined based on any reference signal received power measurement result on the first non-anchor carrier, the reference signal received power measurement result on the first anchor carrier, the reference signal received power measurement result on the first non-anchor carrier, and the second power difference meet the following formula:

$$\text{the reference signal received power measurement result on the first anchor carrier} = \text{the reference signal received power measurement result on the first non-anchor carrier} + \text{the second power difference}.$$

For a manner of configuring the second power difference, refer to descriptions in the foregoing embodiment. Details are not described herein again.

Optionally, in this implementation, the network device may further send fourth indication information to the communications device. The fourth indication information indicates that it is allowed that the m reference signal received power measurement results/result on the first anchor carrier are determined based on the m reference signal received power measurement results/result on the first non-anchor carrier. Further, after receiving the fourth indication information, the communications device may determine, based on the m reference signal received power measurement results/result on the first non-anchor carrier, the m reference signal received power measurement results/result on the first anchor carrier, and perform criterion S determining on the serving cell based only on the first reference signal received power, but skips a step of performing criterion S determining on the serving cell based on first reference signal received quality.

Optionally, in this embodiment of this application, when the network device configures the fourth indication information, the communications device may be indicated based on a capability of the communications device or may be indicated through broadcasting in a system message. This is not specifically limited in this embodiment of this application.

Certainly, in this implementation, the communications device may alternatively perform criterion S determining on the serving cell based on the capability of the communications device and based only on the first reference signal received power, but skips the step of performing criterion S determining on the serving cell based on the first reference signal received quality, and does not need the fourth indication information configured by the network device. This is not specifically limited in this embodiment of this application.

Optionally, in the foregoing plurality of implementations, that the communications device performs criterion S determining on the serving cell based on the first reference signal received power may include: The communications device determines a first received level value based on the first reference signal received power; and the communications device determines that the serving cell meets a criterion S, provided that the first received level value is greater than 0. The communications device may determine the first received level value based on the first reference signal received power and with reference to a formula Srxlev=Qrxlevmeas−Qrxlevmin−Pcompensation−Qoffsettemp. For related descriptions of the formula, refer to an introduction part of the criterion S in a preceding part of DESCRIPTION OF EMBODIMENTS. Details are not described herein again.

In still another possible implementation, the network device sends the reference signal to the communications device on the first non-anchor carrier. Correspondingly, the communications device receives the reference signal from the network device on the first non-anchor carrier. Further, that the communications device determines a first reference signal received power based on at least one reference signal received power measurement result on a first non-anchor carrier includes: The communications device determines the first reference signal received power based on a plurality of reference signal received power measurement results on the first non-anchor carrier, where the first reference signal received power is the reference signal received power on the first non-anchor carrier.

In other words, in this implementation, it is determined that a plurality of reference signal received power measurement results include the plurality of reference signal received power measurement results on the first non-anchor carrier. In addition, the communications device performs criterion S determining on the serving cell based on the reference signal received power on the first non-anchor carrier.

Optionally, in this implementation, the measurement method provided in this embodiment of this application may further include: The communications device determines first reference signal received quality on the first non-anchor carrier based on a plurality of reference signal received quality measurement results on the first non-anchor carrier. Further, that the communications device performs criterion S determining on the serving cell based on the first reference signal received power includes: The communications device performs criterion S determining on the serving cell based on the first reference signal received power and the first reference signal received quality, where a configuration parameter in a criterion S is a configuration parameter corresponding to the first non-anchor carrier, namely, a carrier-specific configuration parameter.

Optionally, that the communications device performs criterion S determining on the serving cell based on the first reference signal received power and the first reference signal received quality may include: The communications device determines the first received level value based on the first reference signal received power; the communications device determines a first quality value based on the first reference signal received quality; and when the first received level value is greater than 0, and the first quality value is greater than 0 the communications device determines that the serving cell meets the criterion S. The communications device may determine the first received level value based on the first reference signal received power and with reference to a formula Srxlev=Qrxlevmeas−Qrxlevmin−Pcompensation−Qoffsettemp. The communications device may determine the first quality value based on the first reference signal received quality and with reference to a formula Squal=Qqualmeas−Qqualmin−Qoffsettemp. For related descriptions of the foregoing formulas, refer to an introduction part of the criterion S in a preceding part of DESCRIPTION OF EMBODIMENTS. For example, a difference lies in that Qrxlevmin, Pcompensation, Qoffsettemp, and Qqualmin are all carrier-specific configuration parameters corresponding to the first non-anchor carrier, that is, Qrxlevmin, Pcompensation, Qoffsettemp, and Qqualmin are carriers distinguished by the network device, and different parameters are independently configured for different carriers. Optionally, in this embodiment of this application, different indexes may be used to represent different carrier configuration parameters. For example, a carrier configuration parameter corresponding to an index 1 may be a carrier-specific configuration parameter corresponding to the first non-anchor carrier. This is not specifically limited in this embodiment of this application.

Optionally, in this embodiment of this application, a new carrier-specific configuration parameter may be configured by using one or more of system message signaling. RRC signaling, or DCI signaling. A type of signaling that is used to configure the new carrier-specific configuration parameter is not specifically limited in this embodiment of this application.

Optionally, in this embodiment of this application, when the network device does not configure a carrier-specific configuration parameter corresponding to a new first non-anchor carrier, the communications device may perform criterion S determining on the serving cell based on the first reference signal received power, the first reference signal received quality, and a configuration parameter corresponding to the first anchor carrier. This is not specifically limited in this embodiment of this application. The configuration parameter corresponding to the first anchor carrier may be a carrier-specific configuration parameter that corresponds to the first anchor carrier and that is configured by the network device for the communications device, that is, Qoffsettemp, Qrxlevmin, Qqualmin, Pcompensation, PEMAX1, and PEMAX2 may be carriers distinguished by the network device, and different parameters are independently configured for different carriers. Optionally, in this embodiment of this application, different indexes may be used to represent different carrier configuration parameters. For example, a carrier configuration parameter corresponding to an index 2 may be a carrier-specific configuration parameter corresponding to the first anchor carrier. This is not specifically limited in this embodiment of this application. Certainly, the configuration parameter corresponding to the first anchor carrier may alternatively be a cell-specific configuration parameter in the conventional technology. This is not specifically limited in this embodiment of this application.

Optionally, in this embodiment of this application, carrier configuration parameters of different carriers may be carried in one piece of signaling or may be carried in a plurality of pieces of signaling. For example, one piece of signaling carries a carrier configuration parameter of one carrier. This is not specifically limited in this embodiment of this application. The signaling herein may be, for example, an RRC message, a system message, or DCI. This is not specifically limited in this embodiment of this application.

Figure 8:
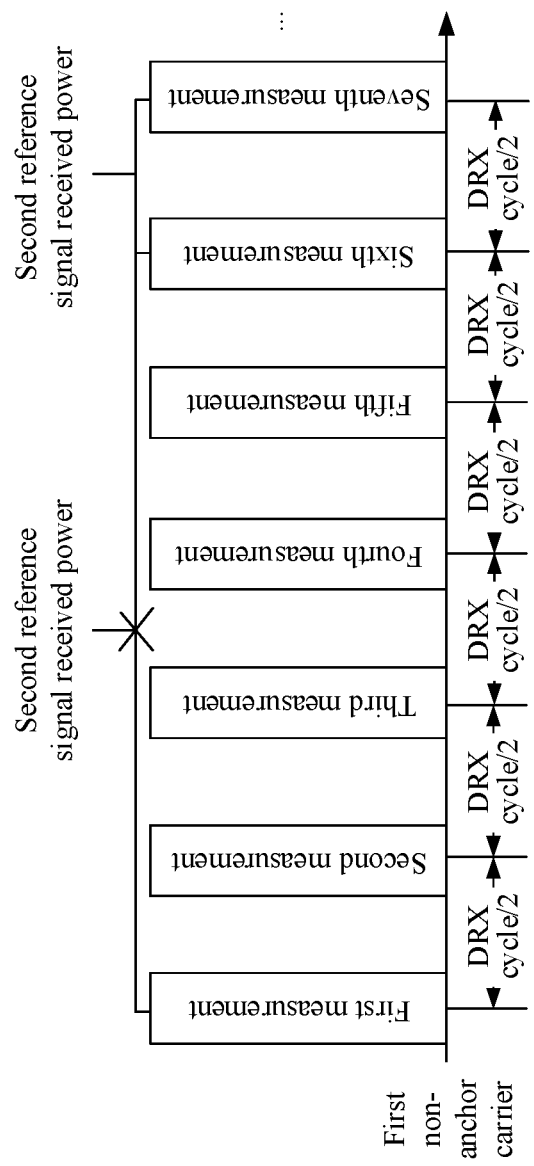
FIG. 8 is a schematic diagram 2 of a method for determining a first reference signal received power according to an embodiment of this application.

Optionally, in this embodiment of this application, in the first possible implementation and the third possible implementation, it is determined that the plurality of reference signal received power measurement results include the plurality of reference signal received power measurement results on the first non-anchor carrier. In this case, among reference signal received power measurements, considering that if a time interval between any two reference signal received power measurements is relatively long, a channel may relatively quickly change, results of the reference signal received power and the reference signal received quality that are obtained from the two measurement results may be inaccurate. Consequently, criterion S determining may be inaccurately performed by using the inaccurate reference signal received power and the inaccurate reference signal received quality. For example, as shown in FIG. 8, in the first possible implementation, the second reference signal received power that is determined by the communications device based on the first measurement result and a sixth reference signal received power measurement result on the first non-anchor carrier may be inaccurate. Consequently, the first reference signal received power that is determined based on the second reference signal received power may be inaccurate. Consequently, the communications device may inaccurately perform criterion S determining on the serving cell based on the first reference signal received power.

Based on the foregoing descriptions, in this embodiment of this application, the time interval between any two measurements of the reference signal received power can be designed to be less than or equal to a first value. The first value may be indicated by using second indication information that is sent by the network device to the communications device or may be set in a protocol. This is not specifically limited in this embodiment of this application.

Optionally, the second indication information in this embodiment of this application may be configured by using one or more of system message signaling. RRC signaling, or DCI signaling. This is not specifically limited in this embodiment of this application.

For example, the second indication information may have the following configuration forms.

Form 1: R DRX cycles. After two measurement results on the first non-anchor carrier exceed a time length of the R DRX cycles, it is not allowed that the reference signal received power and the reference signal received quality are obtained based on the two measurement results.

Form 2: a specific default time length. After two measurement results on the first non-anchor carrier exceed a configured time length, it is not allowed that the reference signal received power and the reference signal received quality are obtained based on the two measurement results.

Optionally, in this embodiment of this application, if a time interval between a plurality of measurements corresponding to a plurality of measurement results for determining the reference signal received power or the reference signal received quality is greater than the first value, the reference signal received power or the reference signal received quality may be determined by using a current measurement result and a next measurement result. This is not specifically limited in this embodiment of this application. For example, as shown in FIG. 8, if a time interval between a first measurement and a sixth measurement is greater than the first value, the communications device may determine the second reference signal received power based on the sixth measurement result and a seventh reference signal received power measurement result on the first non-anchor carrier.

Optionally, in this embodiment of this application, after completing performing criterion S determining on the serving cell within each DRX cycle on the first anchor carrier or the first non-anchor carrier, the terminal device needs to determine whether the serving cell does not meet the criterion S within consecutive N DRX cycles. Therefore, the terminal device may perform criterion S determining on the serving cell on the first anchor carrier or the first non-anchor carrier, rather than performing criterion S determining based on one anchor carrier as in the conventional technology. Therefore, the consecutive N DRX cycles may be on a same carrier or may be on different carriers. There are the following several possible implementations.

In a possible implementation, the measurement method provided in this embodiment of this application further includes: The communications device determines that the serving cell does not meet the criterion S within consecutive N discontinuous reception cycles, where N is a positive integer; and the communications device triggers measurement for a neighboring cell of the serving cell. For example, a value of N herein may be 2 or 4. For example, the neighboring cell herein may be all neighboring cells indicated by the serving cell.

In other words, in this implementation, regardless of whether the terminal device performs measurement on the first anchor carrier or the first non-anchor carrier, if the terminal device does not meet the criterion S on a measured carrier within consecutive N (which may be, for example, 2 or 4) DRX cycles, the terminal device triggers measurement for the neighboring cell of the serving cell.

In another possible implementation, the measurement method provided in this embodiment of this application further includes: The communications device determines that the serving cell does not meet the criterion S within consecutive Q discontinuous reception cycles on the first non-anchor carrier, where Q is a positive integer; and the communications device triggers measurement for a neighboring cell of the serving cell. For example, a value of Q herein may be 2 or 4. For example, the neighboring cell herein may be all neighboring cells indicated by the serving cell.

In other words, in this implementation, regardless of whether the terminal device performs measurement on the first anchor carrier or the first non-anchor carrier, if the terminal device does not meet the criterion S on the first non-anchor carrier within consecutive Q (which may be, for example, 2 or 4) DRX cycles on the first non-anchor carrier, the terminal device triggers measurement for the neighboring cell of the serving cell.

It should be noted that in this embodiment of this application, the consecutive Q discontinuous reception cycles on the first non-anchor carrier are consecutive Q discontinuous reception cycles within which the reference signal received power is measured on the first non-anchor carrier. For example, the reference signal received power is measured on the first non-anchor carrier within a first DRX cycle and a third DRX cycle, and the reference signal received power is measured on the first anchor carrier within a second DRX cycle. Therefore, the first DRX cycle and the third DRX cycle are consecutive two DRX cycles on the first non-anchor carrier.

In still another possible implementation, the measurement method provided in this embodiment of this application further includes: The communications device determines that the serving cell does not meet the criterion S within consecutive T discontinuous reception cycles on the first anchor carrier, where T is a positive integer; and the communications device triggers measurement for a neighboring cell of the serving cell. For example, a value of T herein may be 2 or 4. For example, the neighboring cell herein may be all neighboring cells indicated by the serving cell.

In other words, in this implementation, regardless of whether the terminal device performs measurement on the first anchor carrier or the first non-anchor carrier, if the terminal device does not meet the criterion S on the first anchor carrier within consecutive T (which may be, for example, 2 or 4) DRX cycles on the first anchor carrier, the terminal device triggers measurement for the neighboring cell of the serving cell.

It should be noted that in this embodiment of this application, the consecutive T discontinuous reception cycles on the first anchor carrier are consecutive T discontinuous reception cycles within which the reference signal received power is measured on the first anchor carrier. For example, the reference signal received power is measured on the first anchor carrier within a first DRX cycle and a third DRX cycle, and the reference signal received power is measured on the first non-anchor carrier within a second DRX cycle. Therefore, the first DRX cycle and the third DRX cycle are consecutive two DRX cycles on the first anchor carrier.

Based on the measurement method provided in this embodiment of this application, because the communications device may determine the first reference signal received power based on the at least one reference signal received power measurement result on the first non-anchor carrier and perform criterion S determining on the serving cell based on the first reference signal received power, the communications device can perform criterion S determining on the serving cell when performing RRM measurement on the non-anchor carrier.

The processor 301 in the network device 30 shown in FIG. 3 may invoke application program code stored in the memory 302, to indicate the network device to perform the actions of the network device in steps S501 to S503. The processor 401 in the communications device 40 shown in FIG. 3 may invoke application program code stored in the memory 402, to indicate the network device to perform the actions of the communications device in steps S501 to S503. This is not limited in this embodiment.

Currently, according to a method (agreement) agreed upon in discussion of RAN 4 R16, when a relaxed monitoring measurement rule is met, the communications device may perform measurement on a non-anchor carrier. A problem lies in that the communications device also needs to determine whether the relaxed monitoring measurement rule is met when performing measurement on the non-anchor carrier. When the relaxed monitoring measurement rule is not met, the communications device cannot continue measurement on the non-anchor carrier. However, there is currently no related solution about how the communications device determines whether the relaxed monitoring measurement rule is met while performing measurement on the non-anchor carrier.

To resolve the problem, another measurement method provided in an embodiment of this application is described in detail below with reference to FIG. 2 to FIG. 4 and by using an example in which the network device 30 shown in FIG. 2 interacts with any communications device 40.

Figure 9:
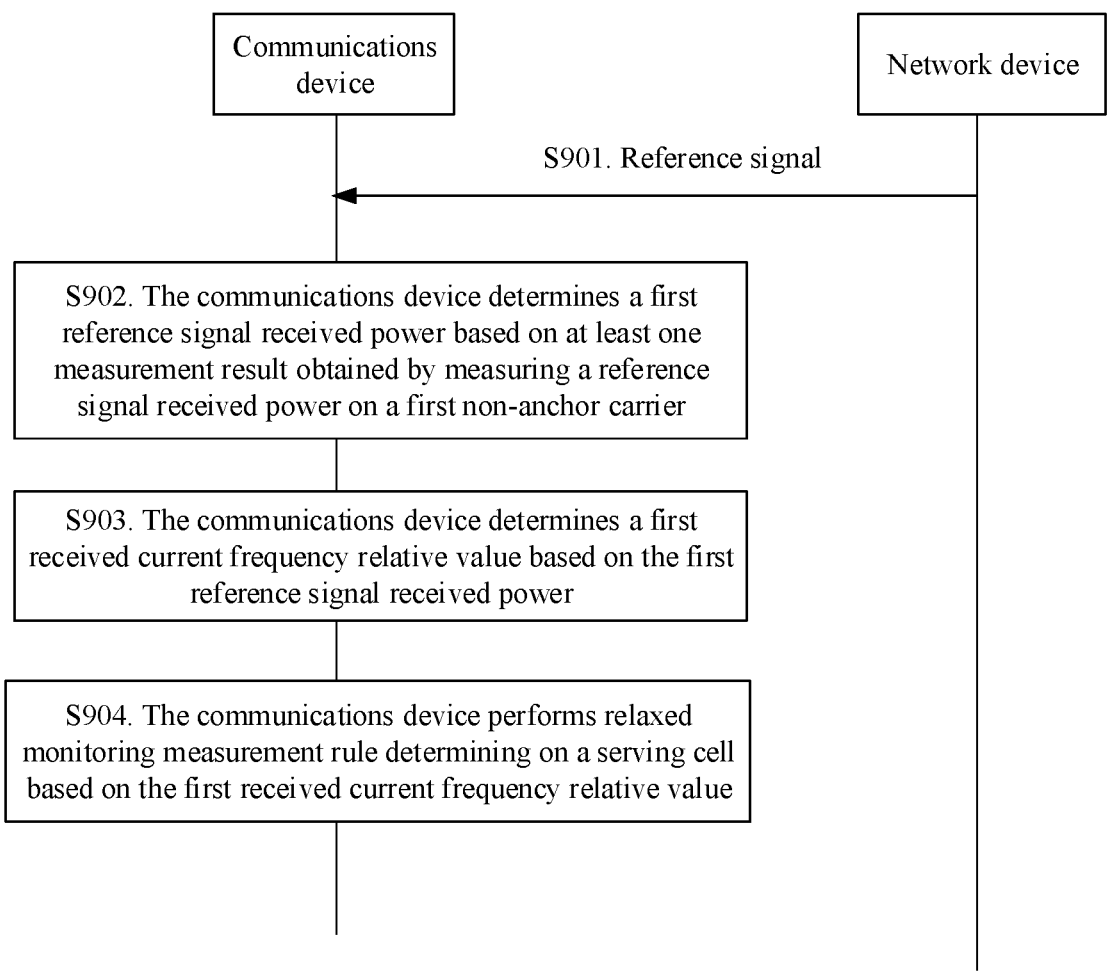
FIG. 9 is a schematic flowchart of another measurement method according to an embodiment of this application.

FIG. 9 shows another measurement method according to an embodiment of this application. The measurement method includes the following steps.

S901: A network device sends a reference signal to a communications device. Correspondingly, the communications device receives the reference signal from the network device.

S902: The communications device determines a first reference signal received power based on at least one reference signal received power measurement result on a first non-anchor carrier, where the first non-anchor carrier is a carrier on which the communications device receives a paging message from the network device in a serving cell in which the communications device is located.

S903: The communications device determines a first received level value based on the first reference signal received power, where the first received level value is a received level value on the first anchor carrier, and the first anchor carrier is an anchor carrier of the serving cell.

S904: The communications device performs relaxed monitoring measurement rule determining on the serving cell based on the first received level value.

In step S901 to step 904:

For a related implementation that the communications device determines the first reference signal received power based on the at least one reference signal received power measurement result on the first non-anchor carrier, refer to the embodiment shown in FIG. 5. Details are not described herein again.

Optionally, in the related implementation that the communications device determines the first reference signal received power based on the at least one reference signal received power measurement result on the first non-anchor carrier, if the first reference signal received power is a reference signal received power on the first anchor carrier, the communications device may determine the first received level value based on the first reference signal received power and with reference to a formula Srxlev=Qrxlevmeas−Qrxlevmin−Pcompensation−Qoffsettemp. For related descriptions of the formula, refer to an introduction part of the criterion S in a preceding part of DESCRIPTION OF EMBODIMENTS. Details are not described herein again.

Figure 10:
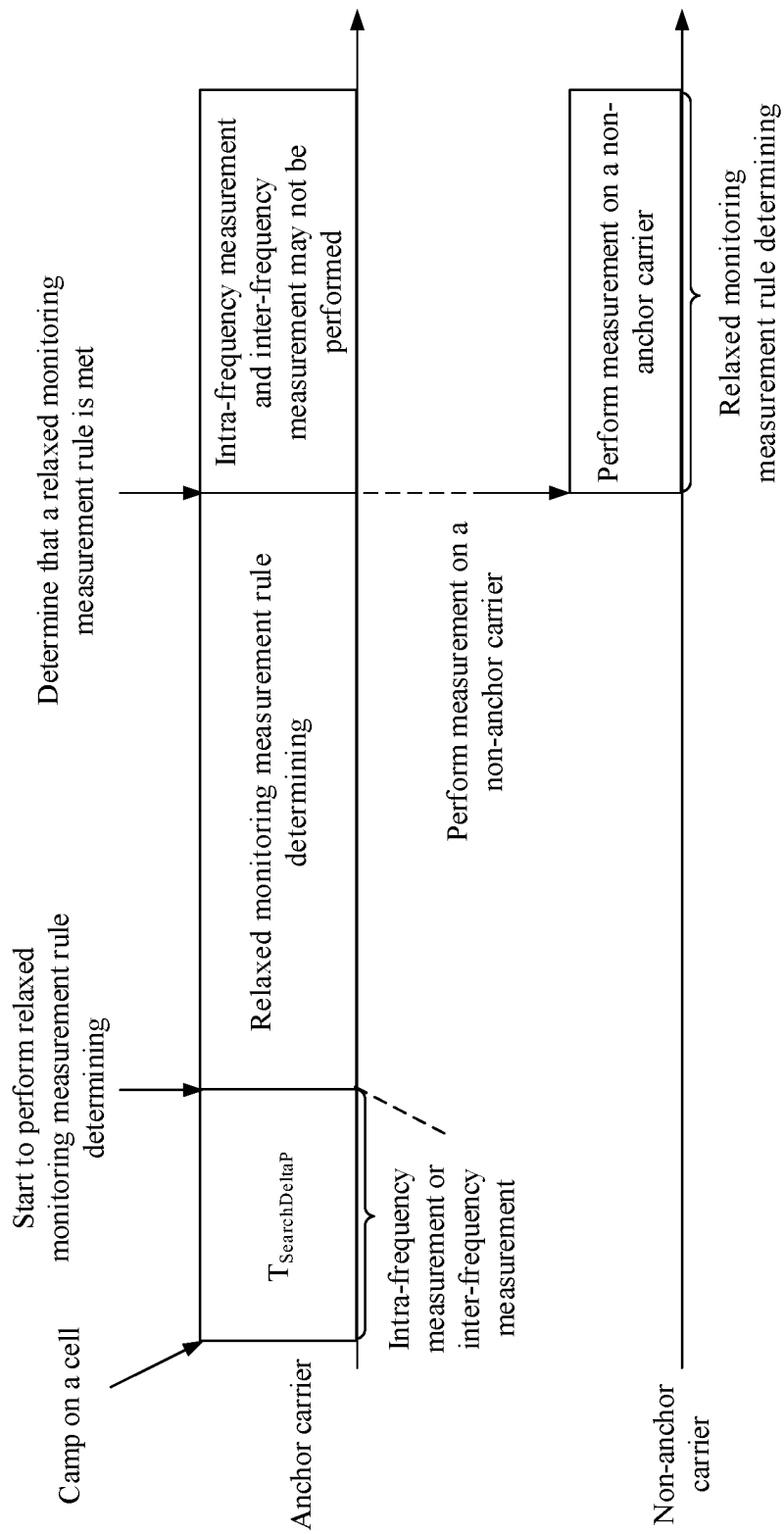
FIG. 10 is a schematic diagram of relaxed monitoring measurement rule determining on a non-anchor carrier according to an embodiment of this application.

Further, after the communications device determines the first reference signal received power based on the at least one reference signal received power measurement result on the first non-anchor carrier and substitutes the determined first received level value into the relaxed monitoring measurement rule, if the three conditions of the relaxed monitoring measurement rule are still met, the communications device may continue measurement on the first non-anchor carrier. Otherwise, the terminal device needs to perform next measurement on the first anchor carrier, as shown in FIG. 10.

Optionally, in the related implementation that the communications device determines the first reference signal received power based on the at least one reference signal received power measurement result on the first non-anchor carrier, if the first reference signal received power is the reference signal received power on the first non-anchor carrier, that the communications device determines a first received level value based on the first reference signal received power includes: The communications device determines a second received level value based on the first reference signal received power and a criterion S, where the second received level value is a received level value on the first non-anchor carrier, and a configuration parameter in the criterion S is a configuration parameter corresponding to the first non-anchor carrier; and the communications device determines the first received level value based on the second received level value.

For example, the communications device may determine the second received level value based on the first reference signal received power and the criterion S and with reference to a formula Srxlev(non)=Qrxlevmeas−Qrxlevmin−Pcompensation−Qoffsettemp. For related descriptions of the formula, refer to an introduction part of the criterion S in a preceding part of DESCRIPTION OF EMBODIMENTS. For example, a difference lies in that Qrxlevmin, Pcompensation, and Qoffsettemp herein are all carrier-specific configuration parameters corresponding to the first non-anchor carrier. For related descriptions of the carrier-specific configuration parameters corresponding to the first non-anchor carrier, refer to the embodiment shown in FIG. 5. Details are not described herein again.

Optionally, in this embodiment of this application, that the communications device determines the first received level value based on the second received level value includes: The communications device determines the first received level value based on the second received level value and a first power difference on the first non-anchor carrier relative to the first anchor carrier.

For example, the first power difference, the second received level value, and the first received level value meet the following formula:

Srxlev=Srxlev(non)+the first power difference. Srxlev(non) represents the second received level value, and Srxlev represents the first received level value.

Optionally, in this embodiment of this application, the first power difference may be indicated by using third indication information sent by the network device to the communications device or may be configured in a protocol. This is not specifically limited in this embodiment of this application.

Optionally, the third indication information in this embodiment of this application may be configured by using one or more of system message signaling, RRC signaling, or DCI signaling. This is not specifically limited in this embodiment of this application.

Further, after the communications device determines the first reference signal received power based on the at least one reference signal received power measurement result on the first non-anchor carrier and substitutes the determined first received level value into the relaxed monitoring measurement rule, if the three conditions of the relaxed monitoring measurement rule are still met, the communications device may continue measurement on the first non-anchor carrier. Otherwise, the terminal device needs to perform next measurement on the first anchor carrier, as shown in FIG. 10.

Based on the measurement method provided in this embodiment of this application, the communications device can determine whether the relaxed monitoring measurement rule is met while performing measurement on the non-anchor carrier.

The processor 301 in the network device 30 shown in FIG. 3 may instruct the network device to execute actions of the network device in step S901 to step S904 by invoking application code stored in the memory 302, and the processor 401 in the communications device 40 shown in FIG. 3 may instruct the network device to execute actions of the communications device in step S901 to step S904 by invoking application code stored in the memory 402. This is not limited in this embodiment.

It may be understood that in the foregoing embodiments, methods and/or steps implemented by the communications device may alternatively be implemented by a chip system that implements functions of the communications device, and methods and/or steps implemented by the network device may alternatively be implemented by a chip system that implements functions of the network device.

The foregoing mainly describes the embodiments of this application from a perspective of interaction between network elements. Correspondingly, an embodiment of this application further provides a communications apparatus, and the communications apparatus is configured to implement the foregoing methods. The communications apparatus may be the communications device in the foregoing method embodiments or a chip system that implements the functions of the communications device; or the communications apparatus may be the network device in the foregoing method embodiments or a chip system that implements the functions of the network device. It may be understood that, to implement the foregoing functions, the communications apparatus includes corresponding hardware structures and/or software modules for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
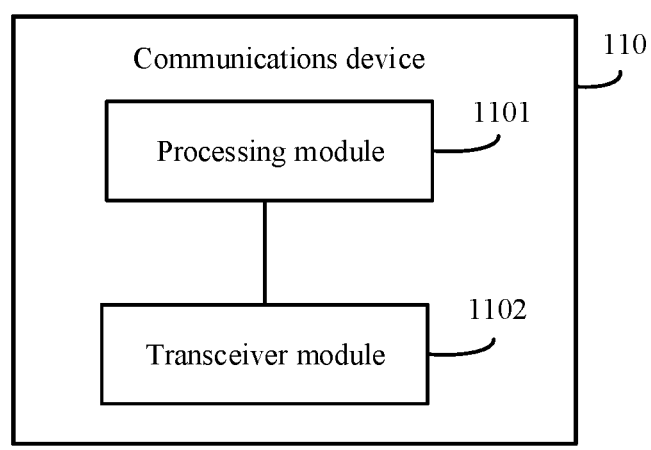
FIG. 11 is another schematic diagram of a structure of a communications device according to an embodiment of this application.

For example, the communications apparatus is the communications device in the foregoing method embodiments. FIG. 11 is a schematic diagram of a structure of a communications device 110. The communications device 110 includes a processing module 1101 and a transceiver module 1102. The transceiver module 1102 may also be referred to as a transceiver unit, configured to implement a sending and/or receiving function. For example, the transceiver module 1102 may be a transceiver circuit, a transceiver, or a communications interface.

In a Possible Implementation:

The transceiver module 1102 is configured to receive a reference signal on a first non-anchor carrier. The processing module 1101 is configured to determine a first reference signal received power based on at least one reference signal received power measurement result on the first non-anchor carrier, where the first non-anchor carrier is a carrier on which the communications device receives a paging message from a network device in a serving cell in which the communications device is located. The processing module 1101 is further configured to perform criterion S determining on the serving cell based on the first reference signal received power.

Optionally, that the processing module 1101 is configured to determine a first reference signal received power based on at least one reference signal received power measurement result on the first non-anchor carrier includes: being configured to: determine a second reference signal received power based on a plurality of reference signal received power measurement results on the first non-anchor carrier, where the second reference signal received power is the reference signal received power on the first non-anchor carrier; and determine the first reference signal received power based on the second reference signal received power, where the first reference signal received power is a reference signal received power on a first anchor carrier, and the first anchor carrier is an anchor carrier of the serving cell.

Optionally, the transceiver module 1102 is further configured to receive first indication information from the network device, where the first indication information indicates that it is allowed that the first reference signal received power is determined based on the second reference signal received power.

Optionally, the transceiver module 1102 is further configured to receive a reference signal on a first anchor carrier, where the first anchor carrier is an anchor carrier of the serving cell; and that the processing module 1101 is configured to determine a first reference signal received power based on at least one reference signal received power measurement result on the first non-anchor carrier includes: being configured to: determine, based on m reference signal received power measurement results/result on the first non-anchor carrier, m reference signal received power measurement results/result on the first anchor carrier, where m is a positive integer; and determine the first reference signal received power based on M−m reference signal received power measurement results/result on the first anchor carrier and the determined m measurement results/result, where the first reference signal received power is a reference signal received power on the first anchor carrier, M is greater than or equal to 2, and M is greater than m.

Optionally, that the processing module 1101 is configured to perform criterion S determining on the serving cell based on the first reference signal received power includes: being configured to: determine a first received level value based on the first reference signal received power; and determine that the serving cell meets a criterion S, provided that the first received level value is greater than 0.

Optionally, that the processing module 1101 is configured to determine a first reference signal received power based on at least one reference signal received power measurement result on the first non-anchor carrier includes: being configured to determine the first reference signal received power based on a plurality of reference signal received power measurement results on the first non-anchor carrier, where the first reference signal received power is the reference signal received power on the first non-anchor carrier.

Further, the processing module 1101 is further configured to determine first reference signal received quality on the first non-anchor carrier based on a plurality of reference signal received quality measurement results on the first non-anchor carrier. Correspondingly, that the processing module 1101 is configured to perform criterion S determining on the serving cell based on the first reference signal received power includes: being configured to perform criterion S determining on the serving cell based on the first reference signal received power and the first reference signal received quality, where a configuration parameter in a criterion S is a configuration parameter corresponding to the first non-anchor carrier.

Optionally, a time interval between any two measurements of the reference signal received power among measurements of the reference signal received power on the first non-anchor carrier is less than or equal to a first value.

Optionally, the transceiver module 1102 is further configured to receive second indication information from the network device, where the second indication information is used to indicate the first value.

Optionally, the processing module 1101 is further configured to determine that the serving cell does not meet the criterion S within consecutive N discontinuous reception cycles, where N is a positive integer. The processing module 1101 is further configured to trigger measurement for a neighboring cell of the serving cell.

Alternatively, optionally, the processing module 1101 is further configured to determine that the serving cell does not meet the criterion S within consecutive Q discontinuous reception cycles on the first non-anchor carrier, where Q is a positive integer. The processing module 1101 is further configured to trigger measurement for a neighboring cell of the serving cell.

In another possible implementation:

The transceiver module 1102 is configured to receive a reference signal on a first non-anchor carrier. The processing module 1101 is configured to determine a first reference signal received power based on at least one reference signal received power measurement result on the first non-anchor carrier, where the first non-anchor carrier is a carrier on which the communications device receives a paging message from a network device in a serving cell in which the communications device is located. The processing module 1101 is further configured to determine a first received level value based on the first reference signal received power, where the first received level value is a received level value on the first anchor carrier, and the first anchor carrier is an anchor carrier of the serving cell. The processing module 1101 is further configured to perform relaxed monitoring measurement rule determining on the serving cell based on the first received level value.

Optionally, that the processing module 1101 is configured to determine a first reference signal received power based on at least one reference signal received power measurement result on the first non-anchor carrier includes: being configured to: determine a second reference signal received power based on a plurality of reference signal received power measurement results on the first non-anchor carrier, where the second reference signal received power is the reference signal received power on the first non-anchor carrier; and determine the first reference signal received power based on the second reference signal received power, where the first reference signal received power is a reference signal received power on the first anchor carrier, and the first anchor carrier is an anchor carrier of the serving cell.

Optionally, the transceiver module 1102 is further configured to receive first indication information from the network device, where the first indication information indicates that it is allowed that the first reference signal received power is determined based on the second reference signal received power.

Optionally, the transceiver module 1102 is further configured to receive a reference signal on a first anchor carrier, where the first anchor carrier is an anchor carrier of the serving cell; and that the processing module 1101 is configured to determine a first reference signal received power based on at least one reference signal received power measurement result on the first non-anchor carrier includes: being configured to: determine, based on m reference signal received power measurement results/result on the first non-anchor carrier, m reference signal received power measurement results/result on the first anchor carrier, where m is a positive integer; and determine the first reference signal received power based on M−m reference signal received power measurement results/result on the first anchor carrier and the determined m measurement results/result, where the first reference signal received power is a reference signal received power on the first anchor carrier, M is greater than or equal to 2, and M is greater than m.

Optionally, that the processing module 1101 is configured to determine a first reference signal received power based on at least one reference signal received power measurement result on the first non-anchor carrier includes: being configured to determine the first reference signal received power based on a plurality of reference signal received power measurement results on the first non-anchor carrier, where the first reference signal received power is the reference signal received power on the first non-anchor carrier.

Further, that the processing module 1101 is configured to determine a first received level value based on the first reference signal received power includes: being configured to: determine a second received level value based on the first reference signal received power and a criterion S, where the second received level value is a received level value on the first non-anchor carrier, and a configuration parameter in the criterion S is a configuration parameter corresponding to the first non-anchor carrier; and determine the first received level value based on the second received level value.

Optionally, that the processing module 1101 is configured to determine the first received level value based on the second received level value includes: being configured to determine the first received level value based on the second received level value and a first power difference on the first non-anchor carrier relative to the first anchor carrier.

Optionally, the transceiver module 1102 is further configured to receive third indication information from the network device, where the third indication information is used to indicate the first power difference.

Optionally, a time interval between any two measurements of the reference signal received power among measurements of the reference signal received power on the first non-anchor carrier is less than or equal to a first value.

Optionally, the transceiver module 1102 is further configured to receive second indication information from the network device, where the second indication information is used to indicate the first value.

All related content of the steps in the foregoing method embodiments may be cited in function descriptions of corresponding functional modules. Details are not described herein again.

In this embodiment, the communications device 110 is presented with the functional modules implemented through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art can figure out that the communications device 110 may use a form of the communications device 30 shown in FIG. 3.

For example, the processor 401 in the communications device 40 shown in FIG. 3 can enable, by invoking computer-executable instructions stored in the memory 402, the communications device 40 to perform the measurement method in the foregoing method embodiment.

Specifically, the processor 401 in the communications device 40 shown in FIG. 3 may invoke the computer-executable instructions stored in the memory 402, to implement functions/implementation processes of the processing module 1101 and the transceiver module 1102 in FIG. 11. Alternatively, the functions/implementation processes of the processing module 1101 in FIG. 11 may be implemented by the processor 401 in the communications device 40 shown in FIG. 3 by invoking the computer-executable instructions stored in the memory 402, and the functions/implementation processes of the transceiver module 1102 in FIG. 11 may be implemented by the transceiver 403 in the communications device 40 shown in FIG. 3.

Because the communications device 110 provided in this embodiment can perform the foregoing measurement method, for technical effects achieved by the communications device 110, refer to the foregoing method embodiment. Details are not described herein again.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory, to indicate the communications apparatus to perform the method in any one of the foregoing method embodiments. Certainly, the memory may not be located in the communications apparatus. When the communications apparatus is a chip system, the communications apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like. In this embodiment of this application, the computer may include the apparatuses described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, various modifications and combinations may be made to them without departing from the spirit and scope of this application. Correspondingly, the specification and accompanying drawings are merely example descriptions of this application defined by the appended claims, and are considered as having covered any of or all modifications, variations, combinations, or equivalents in the scope of this application. A person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A measurement method, comprising:
   determining, by a communications device, a first reference signal received power based on at least one reference signal received power measurement result on a first non-anchor carrier, including:
      determining, by the communications device based on m reference signal received power measurement results on the first non-anchor carrier, m reference signal received power measurement results on a first anchor carrier, wherein the first anchor carrier is an anchor carrier of a serving cell, and m is a positive integer;
      determining, by the communications device, the first reference signal received power based on M−m reference signal received power measurement results on the first anchor carrier and the m reference signal received power measurement results on the first anchor carrier, wherein the first reference signal received power is a reference signal received power on the first anchor carrier, M is greater than or equal to 2, and M is greater than m;
   wherein the first non-anchor carrier is a carrier on which the communications device receives a paging message from a network device in the serving cell in which the communications device is located;
   determining, by the communications device, a criterion S on the serving cell based on the first reference signal received power; and
   wherein the criterion S is a basic condition for a terminal device to camp on a current cell, and the criterion S is met based on Srxlev>0 and Squal>0, wherein the Srxlev is a calculated cell received level value, and the Squal is a calculated cell quality value, both of the Srxlev and the Squal are used to determine whether the serving cell meets the criterion S.

2. The method according to claim 1, wherein the determining the first reference signal received power based on the at least one reference signal received power measurement result on the first non-anchor carrier comprises:
   determining, by the communications device, a second reference signal received power based on a plurality of reference signal received power measurement results on the first non-anchor carrier, wherein the second reference signal received power is a reference signal received power on the first non-anchor carrier; and
   determining, by the communications device, the first reference signal received power based on the second reference signal received power, wherein the first reference signal received power is a reference signal received power on a first anchor carrier, and the first anchor carrier is an anchor carrier of the serving cell.

3. The method according to claim 2, wherein a time interval between two measurements among reference signal received power measurement results is less than or equal to a first value.

4. The method according to claim 2, wherein the determining the criterion S on the serving cell based on the first reference signal received power comprises:
   determining, by the communications device, a first Srxlev based on the first reference signal received power; and
   determining, by the communications device, that the serving cell meets the criterion S, in response to the first Srxlev being greater than 0.

5. The method according to claim 1, further comprising:
   determining, by the communications device, that the serving cell does not meet the criterion S within consecutive N discontinuous reception cycles, wherein N is a positive integer; and
   triggering, by the communications device, a measurement for a neighboring cell of the serving cell.

6. The method according to claim 1, further comprising:
   determining, by the communications device, that the serving cell does not meet the criterion S within consecutive Q discontinuous reception cycles on the first non-anchor carrier, wherein Q is a positive integer; and
   triggering, by the communications device, a measurement for a neighboring cell of the serving cell.

7. The method according to claim 1, further comprising:
   determining, by the communications device, a first Srxlev based on the first reference signal received power, wherein the first Srxlev is a Srxlev on a first anchor carrier and is for determining whether the serving cell meets the criterion S, and the first anchor carrier is an anchor carrier of the serving cell; and
   determining, by the communications device based on the first Srxlev, a relaxed monitoring measurement rule on the serving cell.

8. A measurement method, the method comprising:
   determining, by a communications device, a first reference signal received power based on at least one reference signal received power measurement result on a first non-anchor carrier, including:
      determining, by the communications device based on m reference signal received power measurement results on the first non-anchor carrier, m reference signal received power measurement results on a first anchor carrier, wherein the first anchor carrier is an anchor carrier of a serving cell, and m is a positive integer;
      determining, by the communications device, the first reference signal received power based on M−m reference signal received power measurement results on the first anchor carrier and the m reference signal received power measurement results on the first anchor carrier, wherein the first reference signal received power is a reference signal received power on the first anchor carrier, M is greater than or equal to 2, and M is greater than m;

wherein the first non-anchor carrier is a carrier on which the communications device receives a paging message from a network device in the serving cell in which the communications device is located;

determining, by the communications device, a first Srxlev based on the first reference signal received power, wherein the first Srxlev is a Srxlev on the first anchor carrier, and the first anchor carrier is the anchor carrier of the serving cell;

determining, by the communications device based on the first Srxlev, a relaxed monitoring measurement rule on the serving cell; and wherein the Srxlev is a calculated cell received level value, used to determine whether the serving cell meets a criterion S, wherein the criterion S is a basic condition for a terminal device to camp on a current cell, and the criterion S is met based on the Srxlev>0 and Squal>0, wherein the Squal is a calculated cell quality value, the Squal is also used to determine whether the serving cell meets the criterion S.

9. The method according to claim 8, further comprising:
determining, by the communications device, that the serving cell does not meet the criterion S within consecutive N discontinuous reception cycles, wherein N is a positive integer; and
triggering, by the communications device, a measurement for a neighboring cell of the serving cell.

10. The method according to claim 8, further comprising:
determining, by the communications device, that the serving cell does not meet the criterion S within consecutive Q discontinuous reception cycles on the first non-anchor carrier, wherein Q is a positive integer; and
triggering, by the communications device, a measurement for a neighboring cell of the serving cell.

11. A communications device, comprising:
at least one processor; and
one or more memories coupled to the at least one processor and storing programming instructions for execution by the at least one processor to:
receive a reference signal on a first non-anchor carrier;
determine a first reference signal received power based on at least one reference signal received power measurement result on the first non-anchor carrier, including:
    determining, based on m reference signal received power measurement results on the first non-anchor carrier, m reference signal received power measurement results on a first anchor carrier, wherein the first anchor carrier is an anchor carrier of a serving cell, and m is a positive integer;
    determining, the first reference signal received power based on M–m reference signal received power measurement results on the first anchor carrier and the m reference signal received power measurement results on the first anchor carrier, wherein the first reference signal received power is a reference signal received power on the first anchor carrier, M is greater than or equal to 2, and M is greater than m;
wherein the first non-anchor carrier is a carrier on which the communications device receives a paging message from a network device in the serving cell in which the communications device is located;
determining a criterion S on the serving cell based on the first reference signal received power; and
wherein the criterion S is a basic condition for a terminal device to camp on a current cell, and the criterion S is met based on Srxlev>0 and Squal>0, wherein the Srxlev is a calculated cell received level value, and the Squal is a calculated cell quality value, both of the Srxlev and the Squal are used to determine whether the serving cell meets the criterion S.

12. The communications device according to claim 11, wherein the one or more memories store the programming instructions for the execution by the at least one processor to:
determine a second reference signal received power based on a plurality of reference signal received power measurement results on the first non-anchor carrier, wherein the second reference signal received power is a reference signal received power on the first non-anchor carrier; and
determine the first reference signal received power based on the second reference signal received power, wherein the first reference signal received power is a reference signal received power on a first anchor carrier, and the first anchor carrier is an anchor carrier of the serving cell.

13. The communications device according to claim 12, wherein a time interval between two measurements among reference signal received power measurement results is less than or equal to a first value.

14. The communications device according to claim 12, wherein the one or more memories store the programming instructions for the execution by the at least one processor to:
determine a first Srxlev based on the first reference signal received power; and
determine that the serving cell meets the criterion S, in response to the first Srxlev being greater than 0.

15. The communications device according to claim 11, wherein the one or more memories store the programming instructions for the execution by the at least one processor to:
receive a reference signal on a first anchor carrier, wherein the first anchor carrier is an anchor carrier of the serving cell.

16. The communications device according to claim 11, wherein the one or more memories store the programming instructions for the execution by the at least one processor to:
determine that the serving cell does not meet the criterion S within consecutive N discontinuous reception cycles, wherein N is a positive integer; and
trigger a measurement for a neighboring cell of the serving cell.

17. The communications device according to claim 11, wherein the one or more memories store the programming instructions for the execution by the at least one processor to:
determine that the serving cell does not meet the criterion S within consecutive Q discontinuous reception cycles on the first non-anchor carrier, wherein Q is a positive integer; and
trigger a measurement for a neighboring cell of the serving cell.

18. A communications device, comprising:
at least one processor; and
one or more memories coupled to the at least one processor and storing programming instructions for an execution by the at least one processor to:

receive a reference signal on a first non-anchor carrier;
determine a first reference signal received power based on at least one reference signal received power measurement result on the first non-anchor carrier, including:
- determining, based on m reference signal received power measurement results on the first non-anchor carrier, m reference signal received power measurement results on a first anchor carrier, wherein the first anchor carrier is an anchor carrier of a serving cell, and m is a positive integer;
- determining, the first reference signal received power based on M−m reference signal received power measurement results on the first anchor carrier and the m reference signal received power measurement results on the first anchor carrier, wherein the first reference signal received power is a reference signal received power on the first anchor carrier, M is greater than or equal to 2, and M is greater than m;

wherein the first non-anchor carrier is a carrier on which the communications device receives a paging message from a network device in the serving cell in which the communications device is located;

determine a first Srxlev based on the first reference signal received power, wherein the first Srxlev is a Srxlev on the first anchor carrier, and the first anchor carrier is the anchor carrier of the serving cell;

determine, based on the first Srxlev, a relaxed monitoring measurement rule on the serving cell; and wherein the Srxlev is a calculated cell received level value, used to determine whether the serving cell meets a criterion S, wherein the criterion S is a basic condition for a terminal device to camp on a current cell, and the criterion S is met based on the Srxlev>0 and Squal>0, wherein the Squal is a calculated cell quality value, the Squal is also used to determine whether the serving cell meets the criterion S.

19. The communications device according to claim 18, wherein the one or more memories store the programming instructions for the execution by the at least one processor to:
- determine, that the serving cell does not meet the criterion S within consecutive N discontinuous reception cycles, wherein N is a positive integer; and
- trigger, a measurement for a neighboring cell of the serving cell.

20. The communications device according to claim 18, wherein the one or more memories store the programming instructions for the execution by the at least one processor to:
- determine, that the serving cell does not meet the criterion S within consecutive Q discontinuous reception cycles on the first non-anchor carrier, wherein Q is a positive integer; and
- trigger, a measurement for a neighboring cell of the serving cell.

* * * * *